(12) United States Patent
Lee et al.

(10) Patent No.: US 12,054,022 B2
(45) Date of Patent: Aug. 6, 2024

(54) ROBOT

(71) Applicant: LG ELECTRONICS INC., Seoul (KR)

(72) Inventors: Haklim Lee, Seoul (KR); Jiyong Shin, Seoul (KR); Sanghyuk Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/024,905

(22) PCT Filed: Sep. 14, 2020

(86) PCT No.: PCT/KR2020/012380
§ 371 (c)(1),
(2) Date: Mar. 6, 2023

(87) PCT Pub. No.: WO2022/055002
PCT Pub. Date: Mar. 17, 2022

(65) Prior Publication Data
US 2023/0311605 A1 Oct. 5, 2023

(51) Int. Cl.
*B60G 17/016* (2006.01)
*B60G 3/01* (2006.01)
(Continued)

(52) U.S. Cl.
CPC ............ *B60G 17/016* (2013.01); *B60G 3/01* (2013.01); *B60G 11/14* (2013.01);
(Continued)

(58) Field of Classification Search
CPC ........ B60G 17/016; B60G 3/01; B60G 11/14; B60G 17/0157; B60G 2200/422; B60G 2204/423; B60G 2500/30
See application file for complete search history.

(56) References Cited

U.S. PATENT DOCUMENTS 2,874,791 A * 2/1959 Mellencamp ......... B62B 5/0026
180/6.5
3,618,966 A * 11/1971 Vandervest ............. B60B 33/06
280/43.24
(Continued)

FOREIGN PATENT DOCUMENTS

JP 2005-132298 5/2005
JP 2016-224654 12/2016
(Continued)

OTHER PUBLICATIONS

PCT International Application No. PCT/KR2020/012380, International Search Report dated Jun. 1, 2021, 4 pages.

*Primary Examiner* — Frank B Vanaman
(74) *Attorney, Agent, or Firm* — LEE, HONG, DEGERMAN, KANG & WAIMEY

(57) ABSTRACT

A robot according to an embodiment of the present disclosure may comprise: a base; a driving wheel protruding downward from the base; a plate spaced upward from the base; a through hole formed at the plate; a suspension bar including a shaft part rotatably connected to the base and vertically extending upward, and a screw part vertically extending from an upper end of the shaft part toward the through hole; a slider sliding along the shaft part and connected to the driving wheel; a bushing top configured to move up and down along the screw part when the suspension bar rotates; a spring located on an outer circumference of the suspension bar and located between the bushing top and the slider; and a motor disposed above the plate and connected to the screw part through the through hole to rotate the suspension bar.

14 Claims, 19 Drawing Sheets

(51) Int. Cl.
*B60G 11/14* (2006.01)
*B60G 17/015* (2006.01)
*B60G 17/019* (2006.01)

(52) U.S. Cl.
CPC ........ *B60G 17/0157* (2013.01); *B60G 17/019* (2013.01); *B60G 2200/422* (2013.01); *B60G 2202/12* (2013.01); *B60G 2204/423* (2013.01); *B60G 2300/26* (2013.01); *B60G 2400/60* (2013.01); *B60G 2500/30* (2013.01)

(56) References Cited

U.S. PATENT DOCUMENTS

| | | | | |
|---|---|---|---|---|
| 4,515,235 A * | 5/1985 | Yamamoto | ............... | B62D 1/28 180/168 |
| 5,028,073 A * | 7/1991 | Harms | ............... | B60G 13/14 280/5.514 |
| 5,116,016 A * | 5/1992 | Nagata | ............... | B60N 2/505 248/564 |
| 5,201,819 A * | 4/1993 | Shiraishi | ............... | G05D 1/0231 280/43.23 |
| 5,535,843 A * | 7/1996 | Takeda | ............... | B25J 5/007 180/200 |
| 5,549,175 A * | 8/1996 | Torii | ............... | B60G 3/00 180/209 |
| 5,780,782 A * | 7/1998 | O'Dea | ............... | G01G 19/08 177/136 |
| 8,380,396 B2 * | 2/2013 | Maruo | ............... | G05D 1/0263 701/2 |
| 2005/0242532 A1 * | 11/2005 | Deo | ............... | F16F 15/022 280/5.5 |
| 2006/0001223 A1 * | 1/2006 | Krieger | ............... | B60G 15/067 280/6.15 |
| 2006/0060750 A1 | 3/2006 | Alexandridis | | |
| 2006/0243499 A1 * | 11/2006 | Hosoda | ............... | B62D 57/028 180/8.5 |
| 2021/0331542 A1 * | 10/2021 | Ye | ............... | B60G 3/14 |

FOREIGN PATENT DOCUMENTS

| | | |
|---|---|---|
| KR | 10-2014-0076351 | 6/2014 |
| KR | 10-2020-0025102 | 3/2020 |

\* cited by examiner

ROBOT

CROSS-REFERENCE TO RELATED APPLICATIONS

This application is the National Stage filing under 35 U.S.C. 371 of International Application No. PCT/KR2020/012380, filed on Sep. 14, 2020, the contents of which are incorporated by reference herein in its entirety.

TECHNICAL FIELD

The present invention relates to a robot capable of self-driving.

BACKGROUND ART

To take on a part of factory automation, robots have been developed for industrial use. In recent years, the field of application of robots has been further expanded, and not only medical robots and aerospace robots, but also robots that can be used in daily life are being developed.

These robots for everyday life provide specific services (for example, shopping, serving, talking, cleaning, etc.) in response to a user's command.

However, existing robots for everyday life are designed to provide only specific services, and thus there is a problem in that utilization is not high compared to the cost invested in developing the robot.

Accordingly, the need for a robot capable of providing various services has recently emerged.

In particular, a robot capable of self-driving is generally provided with a suspension for stable driving. However, conventional robots have a problem in that the suspension stroke cannot be easily adjusted according to the load of the loaded object or the driving mode.

DISCLOSURE

Technical Problem

The problem to be solved by the present invention is a robot that can easily adjust the suspension stroke.

Technical Solution

A robot according to an embodiment of the present disclosure may comprise: a base; a driving wheel protruding downward from the base; a plate spaced upward from the base; a through hole formed at the plate; a suspension bar including a shaft part rotatably connected to the base and vertically extending upward, and a screw part vertically extending from an upper end of the shaft part toward the through hole; a slider sliding along the shaft part and connected to the driving wheel; a bushing top configured to move up and down along the screw part when the suspension bar rotates; a spring located on an outer circumference of the suspension bar and located between the bushing top and the slider; and a motor disposed above the plate and connected to the screw part through the through hole to rotate the suspension bar.

The Robot further comprises a guide fastened to the bottom surface of the plate to guide a lifting of the bushing top, wherein a guide protrusion protruding in a horizontal direction is formed on the bushing top, and the guide protrusion is inserted into the guide and a guide groove extending in a vertical direction is formed.

wherein the guide comprises fastening part fastened to the bottom surface of the plate; and an extension part extending downward from the fastening part and the guide groove is formed at the extension part.

wherein an accommodation groove is formed in the fastening part, and when the bushing top is in contact with the bottom surface of the plate, an end of the guide protrusion is accommodated in the accommodation groove.

A robot according to an embodiment of the present disclosure may comprise: a base; a driving wheel protruding downward from the base; a plate spaced upward from the base; a suspension bar extending vertically from the base toward the plate; a spring disposed on an outer circumference of the suspension bar; a slider sliding along the suspension bar at a lower side of the spring and connected to the driving wheel; a bushing top sliding along the suspension bar on an upper side of the spring; a motor disposed above the plate; a long hole formed in the plate; and a cam configured to rotate by the motor and press the bushing top downward through the long hole.

wherein the cam may comprise a pair of cam bodies configured to press the bushing top downward and are spaced apart from each other; and a connection shaft connecting the pair of cam bodies, located on an upper side of the plate, and extending in a horizontal direction.

wherein an upper surface of the bushing top may comprise: a first area pressed by one of the pair of cam bodies; and a second area pressed by the other of the pair of cam bodies and symmetrical to the first area with respect to the suspension bar.

The robot may further comprise a rotation shaft connected to the motor and extending in a direction parallel to the connection shaft; and a chain or belt connecting the rotation shaft and the connection shaft.

wherein the bushing top may move up and down between a first height in contact with the bottom surface of the plate and a second height lower than the first height and higher than half of a vertical distance between the base and the plate.

The robot may further comprise a loading unit located on the upper side of the plate and supporting an object; a load cell configured to detect a weight of an object loaded on the loading unit; and a controller configured to control the motor so that the bushing top descends as a sensing value of the load cell increases.

The robot may further comprise a sensor configured to detect a state of a floor surface contacted by the driving wheel; and a controller configured to control the motor according to a sensing value of the sensor.

The robot may further comprise a controller configured to control the motor according to a rotational speed of the driving wheel.

The robot may further comprise a connector fastened to the base; and a suspension arm configured to connect the slider with the driving wheel and rotate about a rotation axis connected to the connector.

The robot may further comprise a plurality of lower pillars extending upward from the base, supporting the plate, and spaced apart in parallel with the suspension bar.

A robot according to an embodiment of the present disclosure may comprise: a base; a pair of driving wheels protruding downward from both sides of the base; a plate spaced upward from the base; a pair of suspension bars vertically extending from the base toward the plate; a pair of springs disposed on outer circumferences of the pair of suspension bars; a pair of sliders sliding along the pair of suspension bars at a downside of the pair of springs and connected to the pair of driving wheels; a pair of bushing tops sliding along the pair of suspension bars at an upper side of the pair of springs; a motor disposed above the plate; a plurality of long holes formed at the plate; and a plurality of cams configured to rotate by the motor and press the pair of bushing tops downward through the plurality of long holes.

wherein each of the plurality of cams may comprise: a pair of cam bodies configured to press the bushing top downward and are spaced apart from each other; and a connection shaft configured to connect the pair of cam bodies and extending in a horizontal direction and located on an upper side of the plate.

The robot may further comprise a rotation shaft coupled to the motor; and a plurality of chains or a plurality of belts configured to connect the rotation shaft and the plurality of connection shafts.

Advantageous Effects

According to a preferred embodiment of the present invention, the suspension stroke of the spring can be adjusted by moving the bushing top up and down by the rotation of the motor. As a result, the strength of the suspension can be adjusted according to the driving condition of the robot, so that the robot can drive stably.

In addition, the guide protrusion protruding from the bushing top may be inserted into a guide groove formed to extend perpendicularly to the guide. As a result, the bushing top can be moved up and down reliably without rotating along with the suspension bar.

In addition, since the guide is fastened to the bottom surface of the plate, it is possible to secure a wide space between the base and the plate.

In addition, when the bushing top is in contact with the bottom surface of the plate, the end of the guide protrusion may be accommodated in the receiving groove of the guide. As a result, the guide protrusion may not interfere with the guide in the process of rising until the bushing top comes into contact with the bottom surface of the plate.

In addition, different areas of the upper surface of the bushing top may be pressed by a pair of cam bodies. As a result, the bushing top can be moved up and down reliably without being deformed.

In addition, the rotation shaft connected to the motor and the connection shaft of the cam may extend horizontally and parallel to each other. As a result, compared to the case where the rotation axis of the motor is disposed vertically, a large free space above the plate can be secured.

Also, a single motor can simultaneously rotate a pair of cams. As a result, the suspension strokes of the pair of springs acting on the pair of driving wheels can always be adjusted equally, and the robot can travel stably without leaning to either side.

In addition, a load cell may be provided in a loading unit where an object is loaded. As a result, the controller can appropriately adjust the suspension stroke of the spring according to the weight of the object, and the robot can travel stably.

In addition, the robot may be equipped with a sensor for detecting the state of the floor surface. As a result, the controller can appropriately adjust the suspension stroke of the spring according to the condition of the floor surface, and the robot can drive stably.

In addition, the controller can properly adjust the suspension stroke of the upper spring according to the driving mode of the robot, that is, the rotation speed of the driving wheel, and the robot can drive stably.

BEST MODE

Figure 1:
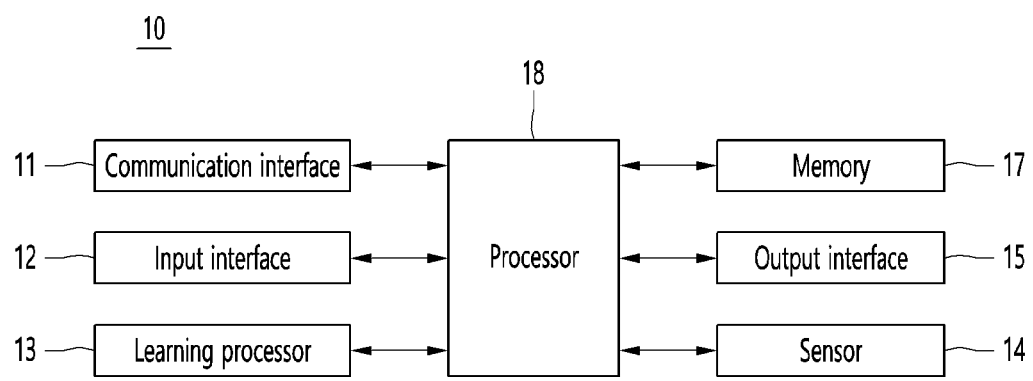
FIG. 1 shows an AI device including a robot according to an embodiment of the present invention.

Hereinafter, detailed embodiments will be described in detail with reference to the accompanying drawings.

Hereinafter, an expression "an element is "coupled" or "connected" to another element" may means that the two elements are directly coupled or connected to each other, or may mean that a third element is present between the two elements and the two elements are coupled or connected to each other by the third element. On the other hand, if it is described that one element is "directly coupled" or "directly connected" to another element, it may be understood that a third element is not present between the two elements.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer if the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route if a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 shows an AI device including a robot according to an embodiment of the present invention.

The AI device 10 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 10 may include a communication interface 11, an input interface 12, a learning processor 13, a sensor 14, an output interface 15, a memory 17, and a processor 18.

The Communication interface 11 may transmit and receive data to and from external devices such as other AI devices 10a to 10e and the AI server 20 by using wire/wireless communication technology. For example, the Communication interface 11 may transmit and receive sensor information, a user input, a learning model, and a control signal to and from external devices.

The communication technology used by the communication interface 11 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 12 may acquire various kinds of data.

At this time, the input interface 12 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 12 may acquire a learning data for model learning and an input data to be used if an output is acquired by using learning model. The input interface 12 may acquire raw input data. In this case, the processor 18 or the learning processor 13 may extract an input feature by preprocessing the input data.

The learning processor 13 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 13 may perform AI processing together with the learning processor 24 of the AI server 20.

At this time, the learning processor 13 may include a memory integrated or implemented in the AI device 10. Alternatively, the learning processor 13 may be implemented by using the memory 17, an external memory directly connected to the AI device 10, or a memory held in an external device.

The sensor 14 may acquire at least one of internal information about the AI device 10, ambient environment information about the AI device 10, and user information by using various sensors.

Examples of the sensors included in the sensor 14 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a Lidar, and a radar.

The output interface 15 may generate an output related to a visual sense, an auditory sense, or a haptic sense.

At this time, the output interface 15 may include a display unit for outputting time information, a speaker for outputting auditory information, and a haptic module for outputting haptic information.

The memory 17 may store data that supports various functions of the AI device 10. For example, the memory 17 may store input data acquired by the input interface 12, learning data, a learning model, a learning history, and the like.

The processor 18 may determine at least one executable operation of the AI device 10 based on information determined or generated by using a data analysis algorithm or a machine learning algorithm. The processor 18 may control the components of the AI device 10 to execute the determined operation.

To this end, the processor 18 may request, search, receive, or utilize data of the learning processor 13 or the memory 17. The processor 18 may control the components of the AI device 10 to execute the predicted operation or the operation determined to be desirable among the at least one executable operation.

If the connection of an external device is required to perform the determined operation, the processor 18 may generate a control signal for controlling the external device and may transmit the generated control signal to the external device.

The processor 18 may acquire intention information for the user input and may determine the user's requirements based on the acquired intention information.

The processor 18 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 13, may be learned by the learning processor 24 of the AI server 20, or may be learned by their distributed processing.

The processor 18 may collect history information including the operation contents of the AI apparatus 100 or the user's feedback on the operation and may store the collected history information in the memory 17 or the learning processor 13 or transmit the collected history information to the external device such as the AI server 20. The collected history information may be used to update the learning model.

The processor 18 may control at least part of the components of AI device 10 so as to drive an application program stored in memory 17. Furthermore, the processor 18 may operate two or more of the components included in the AI device 10 in combination so as to drive the application program.

Figure 2:
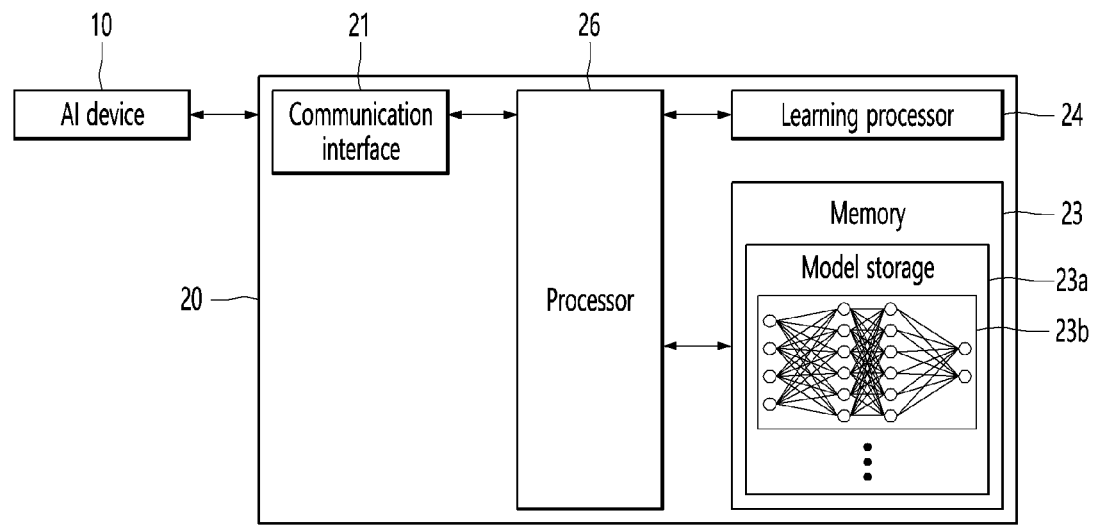
FIG. 2 shows an AI server connected to a robot according to an embodiment of the present invention.

FIG. 2 illustrates an AI server 20 connected to a robot according to an embodiment of the present disclosure.

Referring to FIG. 2, the AI server 20 may refer to a device that learns an artificial neural network by using a machine learning algorithm or uses a learned artificial neural network. The AI server 20 may include a plurality of servers to perform distributed processing, or may be defined as a 5G network. At this time, the AI server 20 may be included as a partial configuration of the AI device 10, and may perform at least part of the AI processing together.

The AI server 20 may include a communication interface 21, a memory 23, a learning processor 24, a processor 26, and the like.

The Communication interface 21 can transmit and receive data to and from an external device such as the AI device 10.

The memory 23 may include a model storage unit 23*a*. The model storage unit 23*a* may store a learning or learned model (or an artificial neural network 26*b*) through the learning processor 24.

The learning processor 24 may learn the artificial neural network 26*b* by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in memory 23.

The processor 26 may infer the result value for new input data by using the learning model and may generate a response or a control command based on the inferred result value.

Figure 3:
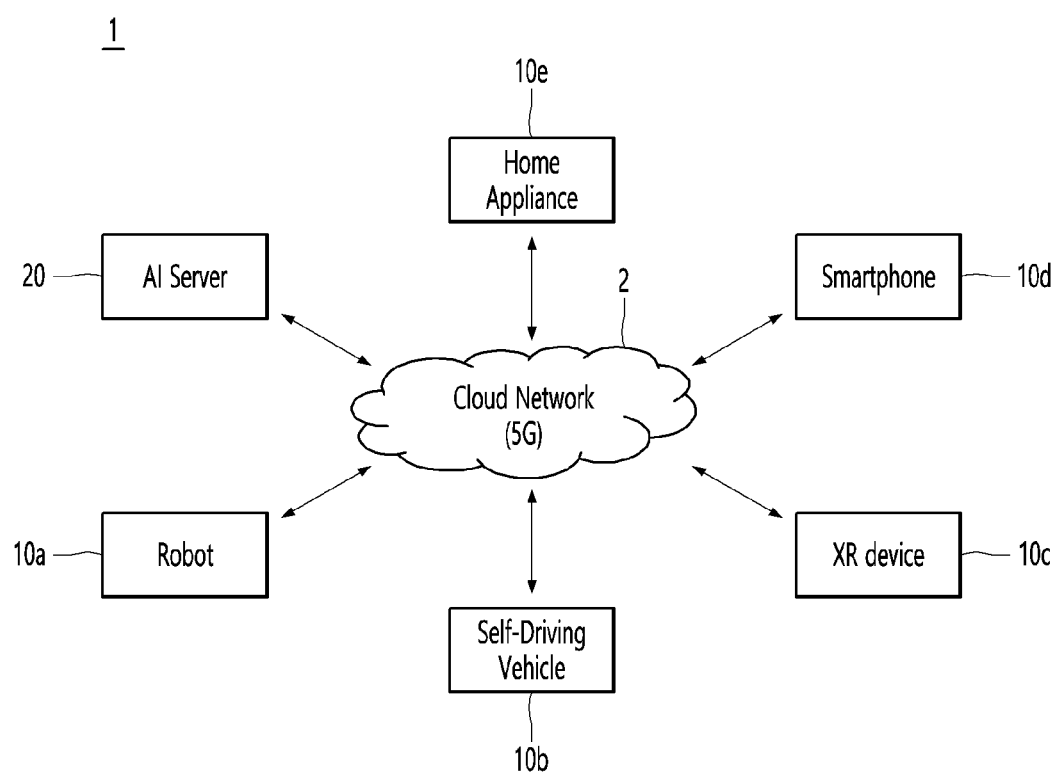
FIG. 3 shows an AI system according to an embodiment of the present invention.

FIG. 3 illustrates an AI system 1 according to an embodiment of the present disclosure.

Referring to FIG. 3, in the AI system 1, at least one of an AI server 20, a robot 10*a*, a self-driving vehicle 10*b*, an XR device 10*c*, a smartphone 10*d*, or a home appliance 10*e* is connected to a cloud network 2. The robot 10*a*, the self-driving vehicle 10*b*, the XR device 10*c*, the smartphone 10*d*, or the home appliance 10*e*, to which the AI technology is applied, may be referred to as AI devices 10*a* to 10*e*.

The cloud network 2 may refer to a network that forms part of a cloud computing infrastructure or exists in a cloud computing infrastructure. The cloud network 2 may be configured by using a 3G network, a 4G or LTE network, or a 5G network.

That is, the devices 10*a* to 10*e* and 20 configuring the AI system 1 may be connected to each other through the cloud network 2. In particular, each of the devices 10*a* to 10*e* and 20 may communicate with each other through a base station, but may directly communicate with each other without using a base station.

The AI server 20 may include a server that performs AI processing and a server that performs operations on big data.

The AI server 20 may be connected to at least one of the AI devices constituting the AI system 1, that is, the robot 10a, the self-driving vehicle 10b, the XR device 10c, the smartphone 10d, or the home appliance 10e through the cloud network 2, and may assist at least part of AI processing of the connected AI devices 10a to 10e.

At this time, the AI server 20 may learn the artificial neural network according to the machine learning algorithm instead of the AI devices 10a to 10e, and may directly store the learning model or transmit the learning model to the AI devices 10a to 10e.

At this time, the AI server 20 may receive input data from the AI devices 10a to 10e, may infer the result value for the received input data by using the learning model, may generate a response or a control command based on the inferred result value, and may transmit the response or the control command to the AI devices 10a to 10e.

Alternatively, the AI devices 10a to 10e may infer the result value for the input data by directly using the learning model, and may generate the response or the control command based on the inference result.

Hereinafter, various embodiments of the AI devices 10a to 10e to which the above-described technology is applied will be described. The AI devices 10a to 10e illustrated in FIG. 3 may be regarded as a specific embodiment of the AI device 10 illustrated in FIG. 1.

<AI+Robot>

The robot 10a, to which the AI technology is applied, may be implemented as a guide robot, a carrying robot, a cleaning robot, a wearable robot, an entertainment robot, a pet robot, an unmanned flying robot, or the like.

The robot 10a may include a robot control module for controlling the operation, and the robot control module may refer to a software module or a chip implementing the software module by hardware.

The robot 10a may acquire state information about the robot 10a by using sensor information acquired from various kinds of sensors, may detect (recognize) surrounding environment and objects, may generate map data, may determine the route and the travel plan, may determine the response to user interaction, or may determine the operation.

The robot 10a may use the sensor information acquired from at least one sensor among the Lidar, the radar, and the camera so as to determine the travel route and the travel plan.

The robot 10a may perform the above-described operations by using the learning model composed of at least one artificial neural network. For example, the robot 10a may recognize the surrounding environment and the objects by using the learning model, and may determine the operation by using the recognized surrounding information or object information. The learning model may be learned directly from the robot 10a or may be learned from an external device such as the AI server 20.

At this time, the robot 10a may perform the operation by generating the result by directly using the learning model, but the sensor information may be transmitted to the external device such as the AI server 20 and the generated result may be received to perform the operation.

The robot 10a may use at least one of the map data, the object information detected from the sensor information, or the object information acquired from the external apparatus to determine the travel route and the travel plan, and may control the driving unit such that the robot 10a travels along the determined travel route and travel plan.

The map data may include object identification information about various objects arranged in the space in which the robot 10a moves. For example, the map data may include object identification information about fixed objects such as walls and doors and movable objects such as pollen and desks. The object identification information may include a name, a type, a distance, and a position.

In addition, the robot 10a may perform the operation or travel by controlling the driving unit based on the control/interaction of the user. At this time, the robot 10a may acquire the intention information of the interaction due to the user's operation or speech utterance, and may determine the response based on the acquired intention information, and may perform the operation.

<AI+Robot+Self-Driving>

The robot 10a, to which the AI technology and the self-driving technology are applied, may be implemented as a guide robot, a carrying robot, a cleaning robot, a wearable robot, an entertainment robot, a pet robot, an unmanned flying robot, or the like.

The robot 10a, to which the AI technology and the self-driving technology are applied, may refer to the robot itself having the self-driving function or the robot 10a interacting with the self-driving vehicle 10b.

The robot 10a having the self-driving function may collectively refer to a device that moves for itself along the given movement line without the user's control or moves for itself by determining the movement line by itself.

The robot 10a and the self-driving vehicle 10b having the self-driving function may use a common sensing method so as to determine at least one of the travel route or the travel plan. For example, the robot 10a and the self-driving vehicle 10b having the self-driving function may determine at least one of the travel route or the travel plan by using the information sensed through the Lidar, the radar, and the camera.

The robot 10a that interacts with the self-driving vehicle 10b exists separately from the self-driving vehicle 10b and may perform operations interworking with the self-driving function of the self-driving vehicle 10b or interworking with the user who rides on the self-driving vehicle 10b.

At this time, the robot 10a interacting with the self-driving vehicle 10b may control or assist the self-driving function of the self-driving vehicle 10b by acquiring sensor information on behalf of the self-driving vehicle 10b and providing the sensor information to the self-driving vehicle 10b, or by acquiring sensor information, generating environment information or object information, and providing the information to the self-driving vehicle 10b.

Alternatively, the robot 10a interacting with the self-driving vehicle 10b may monitor the user boarding the self-driving vehicle 10b, or may control the function of the self-driving vehicle 10b through the interaction with the user. For example, if it is determined that the driver is in a drowsy state, the robot 10a may activate the self-driving function of the self-driving vehicle 10b or assist the control of the driving unit of the self-driving vehicle 10b. The function of the self-driving vehicle 10b controlled by the robot 10a may include not only the self-driving function but also the function provided by the navigation system or the audio system provided in the self-driving vehicle 10b.

Alternatively, the robot 10a that interacts with the self-driving vehicle 10b may provide information or assist the function to the self-driving vehicle 10b outside the self-driving vehicle 10b. For example, the robot 10a may provide traffic information including signal information and the like, such as a smart signal, to the self-driving vehicle 10b, and automatically connect an electric charger to a charging port by interacting with the self-driving vehicle 10b like an automatic electric charger of an electric vehicle.

Figure 4:
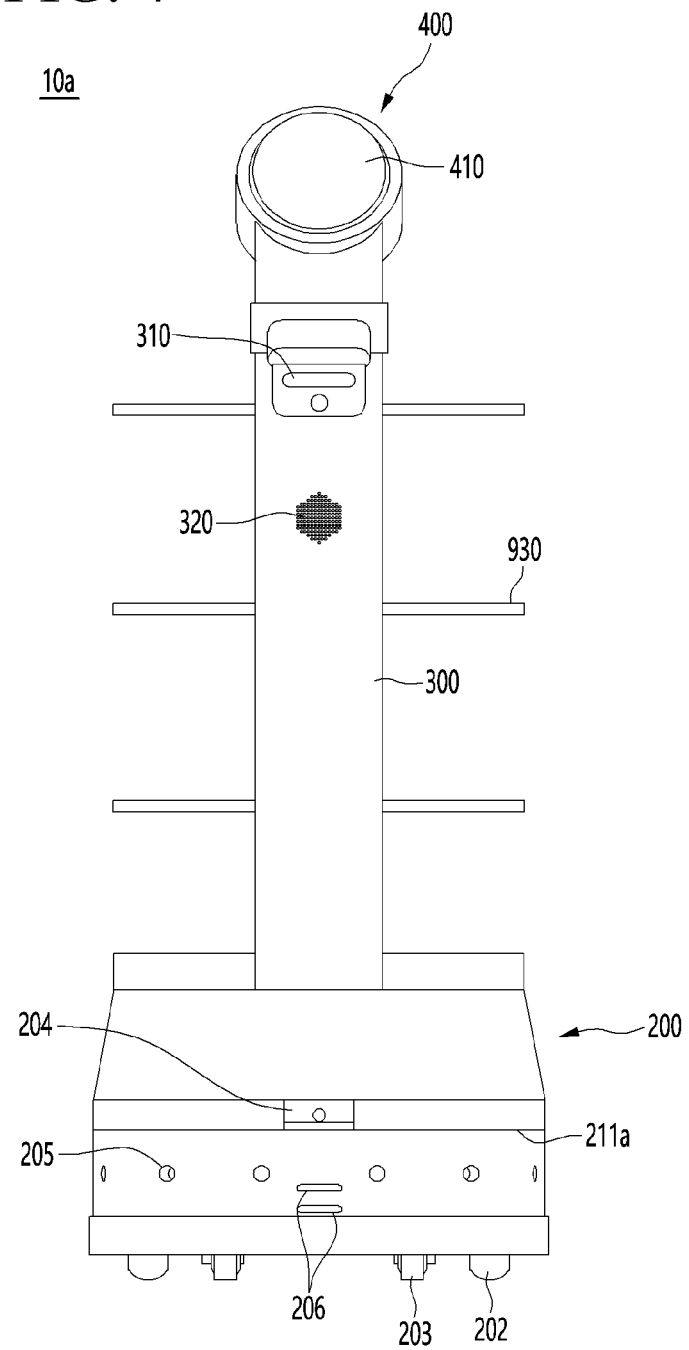
FIG. 4 is a front view of a robot according to an embodiment of the present invention.
Figure 5:
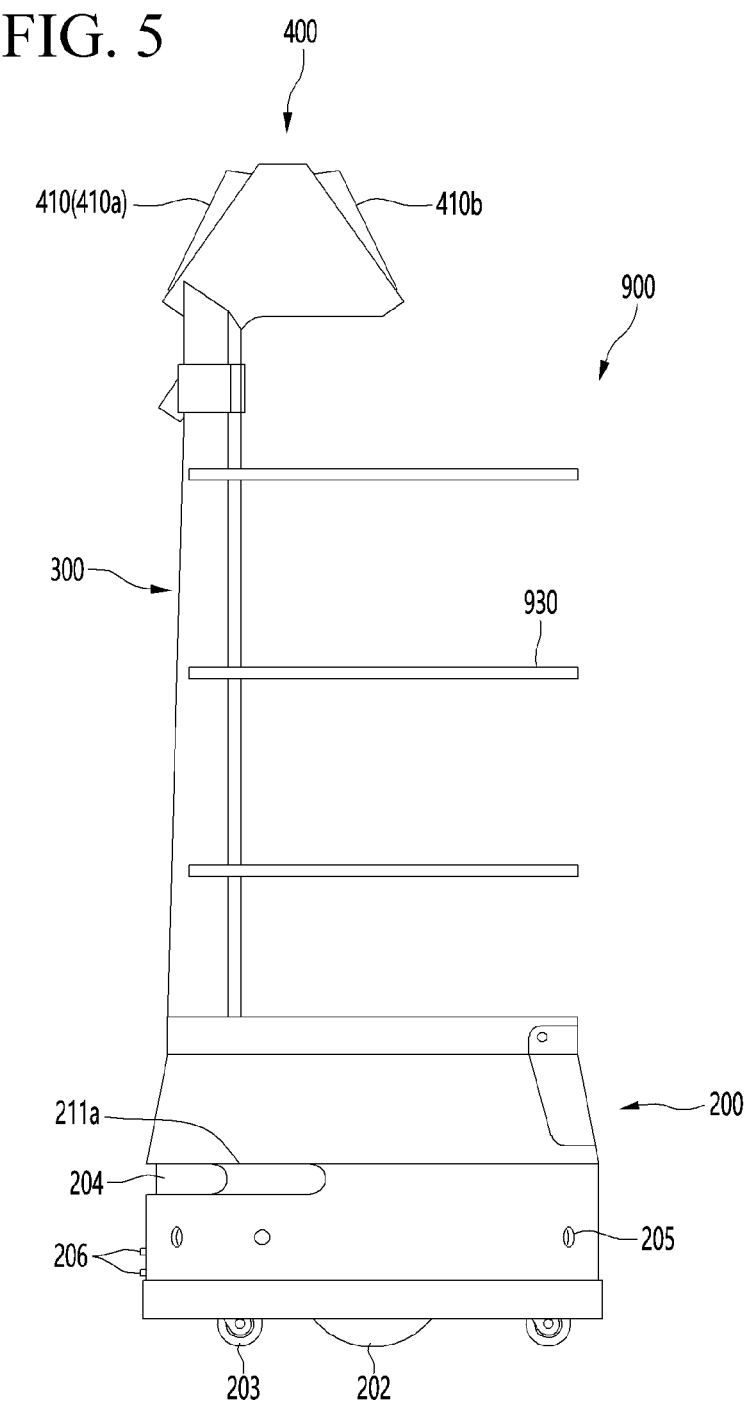
FIG. 5 is a side view of a robot according to an embodiment of the present invention.
Figure 6:
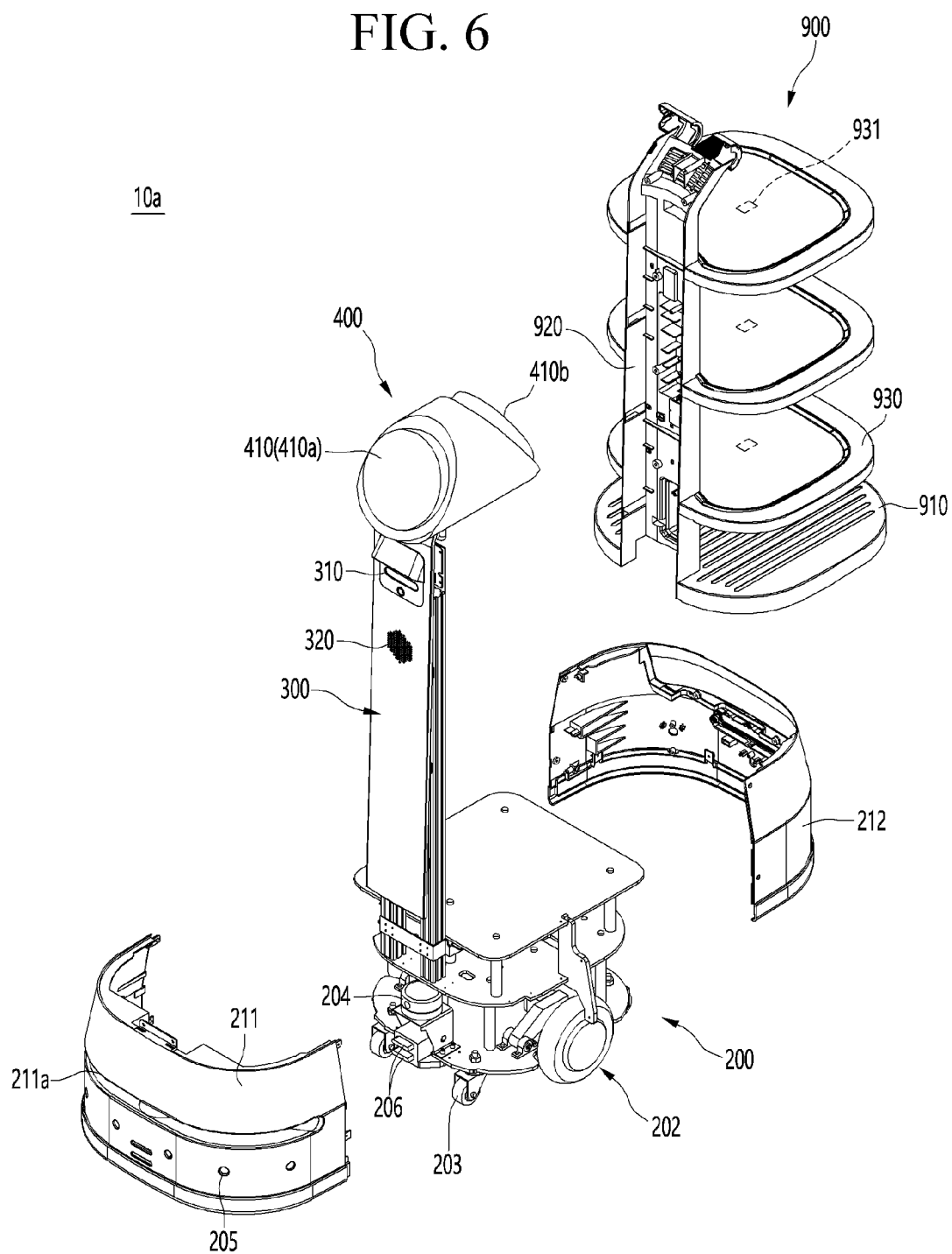
FIG. 6 is an exploded perspective view of a robot according to an embodiment of the present invention.

FIG. 4 is a front view of a robot according to an embodiment of the present invention, FIG. 5 is a side view of a robot according to an embodiment of the present invention and FIG. 6 is an exploded perspective view of a robot according to an embodiment of the present invention.

The robot 10a according to this embodiment may include a main body 200, a neck body 300, and a head 400. The robot 10a may further include a loading module 900.

The main body 200 may include a driving wheel 202 for driving the robot 10a. The driving wheel 202 may protrude downward from the main body 200.

An in-wheel motor may be embedded in the driving wheel 202.

In addition, caster 203 may be provided in the main body 200. The caster 203 may protrude downward from the main body 200 and assist the robot 10a in driving.

The number and location of the driving wheels 202 and caster 203 may vary as needed.

The main body 200 may be accommodated in housing 211 and 212. That is, the housing 211 and 212 may be skins surrounding the main body 200. The housing 211 and 212 may form the exterior of the robot 10a.

The housing 211 and 212 may include a front housing 211 and a rear housing 212. Thus, fastening and separating work of the housing 211 and 212 can be facilitated.

The front housing 211 may be curved convexly forward, and the rear housing 212 may be curved convexly backward. The rear end of the front housing 211 and the front end of the rear housing 212 may come into contact with each other. Each outer surface of the front housing 211 and the rear housing 212 may be continuously connected.

A lidar 204 may be provided in the main body 200. A recessed portion 211a in which the lidar 204 is disposed may be formed in the front housing 211. The recessed portion 211a may be recessed from the front side of the front housing 211 to the rear. The recessed portion 211a is opened toward the front and may be formed long in the left and right directions. The lidar 204 may detect an obstacle or a person located in front of the robot 10a through the recessed portion 211a.

In addition, a plurality of ultrasonic sensors 205 may be provided in the main body 200. The plurality of ultrasonic sensors 205 may be spaced apart from each other along the circumferential direction of the main body 200. The plurality of ultrasonic sensors 205 may detect a driving environment or an object around the robot 10a.

The main body 200 may be provided with a terminal 206 for charging the robot 10a. A through hole through which the terminal 206 passes may be formed in the housing 210, more specifically, the front housing 211. The terminal 206 may protrude forward from the housing 210 through the through hole.

The robot 10a may dock the terminal 206 to a charger (not shown), and the charger may charge the battery 270 built in the robot 10a through the terminal 206. The charger may be installed on an indoor wall or structure in which the robot 10a travels.

On the other hand, the neck body 300 may extend upward from the front portion of the main body 200 long. Neck body 300 may be formed vertically.

A vision sensor 310 may be provided on the neck body 300. The vision sensor 310 may detect a driving environment or an object in front of the robot. For example, the vision sensor 310 may include a camera, more specifically a depth camera. The vision sensor 310 may face forward or in an incline direction between forward and downward.

Therefore, the robot 10a can easily monitor the state of the floor on which the robot 10a travels through the vision sensor 310, and adjust the suspension stroke of the suspension 500 (see FIG. 9) accordingly. This will be described in detail later.

In addition, a sound hole 320 through which sound is emitted may be formed in the neck body 300. The sound hole 320 may be positioned lower than the vision sensor 310. A speaker (not shown) may be provided behind the sound hole 320. The speaker may function as an output interface together with the display 410.

The head 400 may be provided on top of the neck body 300. The head 400 may include a display 410. A preset image or video may be output to the display 410. Also, the display 410 may include a touch panel, and in this case, the touch panel may function as an input interface for receiving a user's input.

The display 410 may include a front display 410a and a rear display 410b. The front display 410a may face forward or face an incline direction between the front and the top. The front display 410a displays an image or video embodying a person's facial expression while the robot 10a is driving, so that the user or the people around can feel a sense of familiarity.

The rear display 410b may face backward or face an incline direction between the rear and the top. A touch panel may be provided on the rear display 410b, and a user may easily input a command from the rear of the head 400 through the rear display 410b.

Meanwhile, the load module 900 may be configured to load an object (not shown) and may be provided on the upper side of the main body 200. The robot 10a may travel in a state in which an object is loaded on the loading module 900 and move the object. The operator may selectively couple various types of loading modules 900 to the main body 200 according to the type of object that varies according to the purpose of use of the robot 10a. That is, the main body 200 may be modularized and used.

For example, the loading module 900 may include a main body cover 910 covering the main body 200 from the upper side and at least one loading unit 930 disposed spaced apart from the upper side of the main body cover 910.

Hereinafter, a case where the loading unit 930 is a plurality of shelves will be described as an example. For example, containers containing food may be placed on the plurality of shelves, and the robot 10a may perform serving. However, it is not limited thereto, and a configuration in which the loading unit 930 is a drawer or a basket is also possible.

The body cover 910 may have a horizontal plate shape. An object may be loaded on the body cover 910. Accordingly, it is also possible that the loading module 900 does not include a separate loading unit 930 and the body cover 910 serves as the loading unit.

An object may be loaded on the loading unit 930. A plurality of shelves included in the loading unit 930 may be formed horizontally and spaced apart from each other in a vertical direction.

The loading module 900 may further include a neck cover 920 that covers the neck body 300 from the rear. The neck cover 920 may extend vertically from the front portion of the body cover 910. A plurality of shelves included in the loading unit 930 may be fixed to the neck cover 920.

However, it is not limited thereto, and it is also possible that the loading module 900 does not include the neck cover 920 and a plurality of shelves included in the loading unit 930 are fixed to the neck body 300.

The loading module 900 may include a load cell 931 that senses a load of an object. In more detail, the load cell 931 may be provided in the loading unit 930. For example, the load cell 931 may be provided on each of the plurality of shelves included in the loading unit 930.

In addition, since the object can be loaded on the body cover 910 as described above, the load cell 931 can also be provided on the body cover 910.

Therefore, the robot 10a can easily calculate the total weight of the object loaded on the loading module 900 by the load cell 931, and can adjust the suspension stroke of the suspension 500 (see FIG. 9) accordingly. This will be described in detail later.

Figure 7:
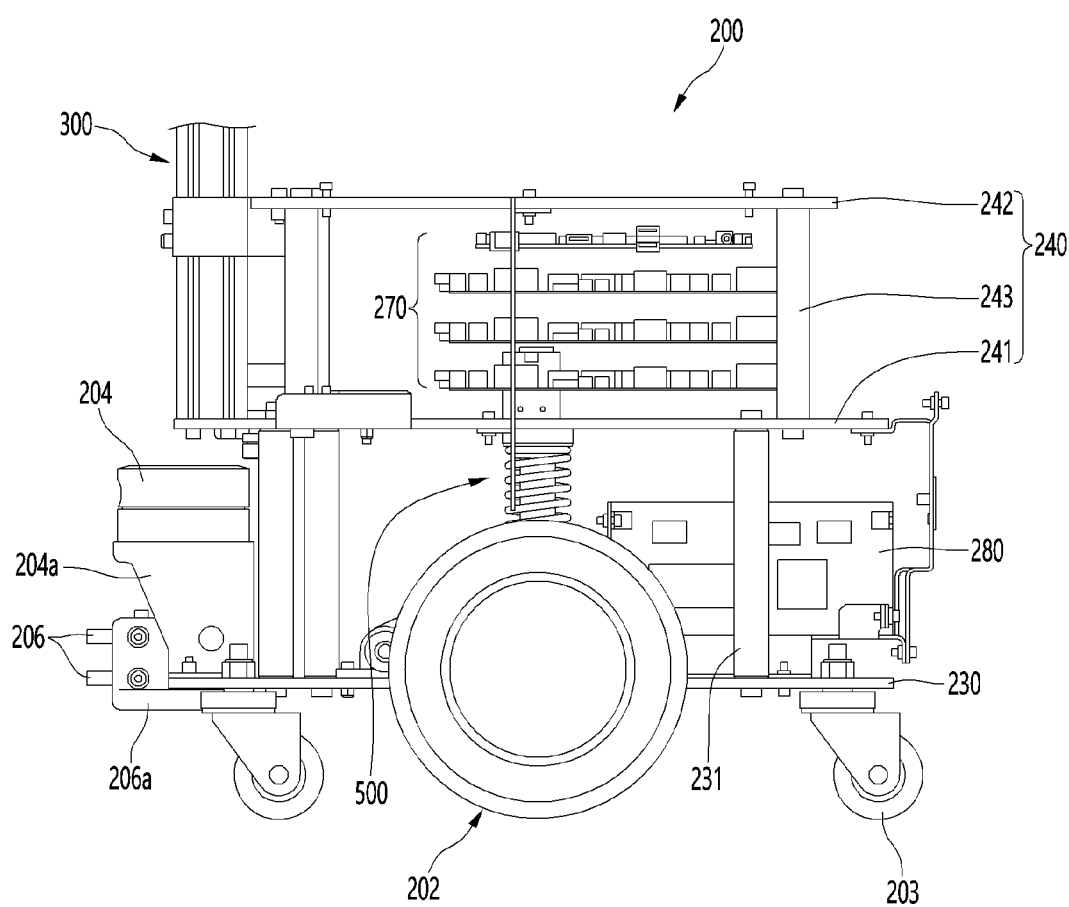
FIG. 7 is a side view of a body of a robot according to an embodiment of the present invention.
Figure 8:
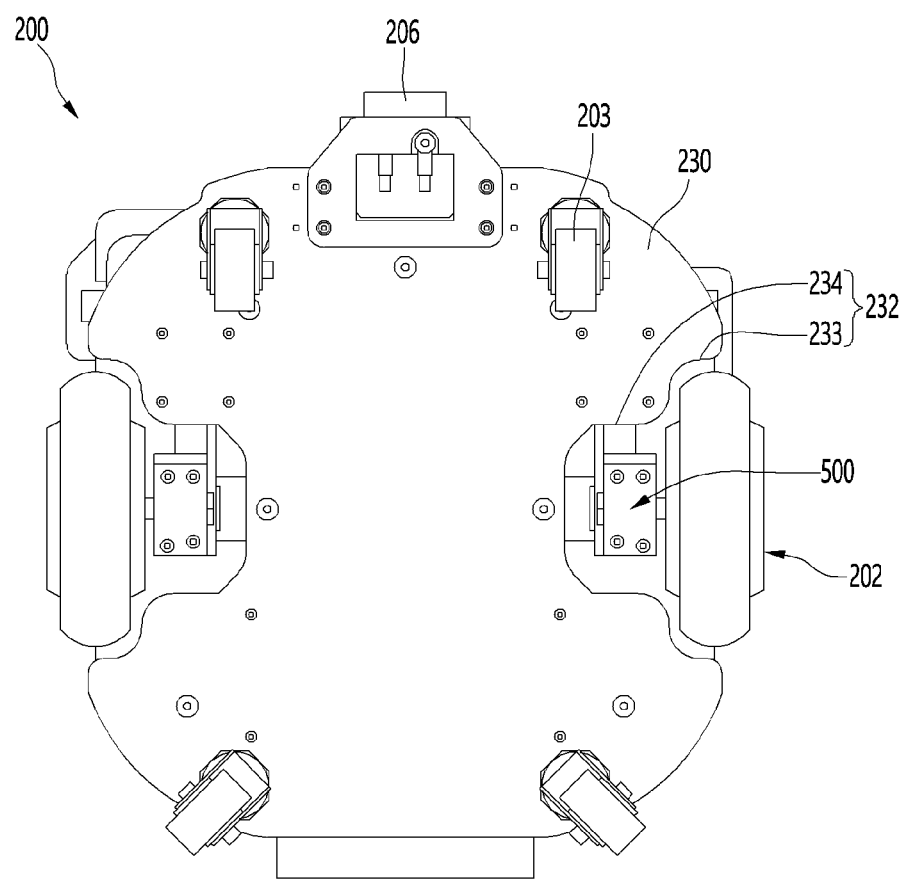
FIG. 8 is a bottom view of a main body of a robot according to an embodiment of the present invention.

FIG. 7 is a side view of a body of a robot according to an embodiment of the present invention and FIG. 8 is a bottom view of a main body of a robot according to an embodiment of the present invention.

The body 200 may include a base 230, a plurality of lower pillars 231 extending upward from the base 230, and an upper module 240 supported by the plurality of lower pillars 231.

Base 230 may be a horizontal plate. The driving wheel 202 and the caster 203 may be connected to the base 230.

The plurality of lower pillars 231 may extend vertically between the base 230 and the upper module 240. The plurality of lower pillars 231 may support the upper module 240 from the lower side. The plurality of lower pillars 231 are spaced apart from each other, and the weight of the upper module 240 can be evenly distributed to the plurality of lower pillars 231.

The lower end of the lower pillar 231 may be fastened to the base 230, and the upper end of the lower pillar 231 may be fastened to the upper module 240, a first plate 241 to be described later in more detail.

That is, the main body 200 may have a substantially mushroom structure. This has the effect of securing a wide inner space and reducing vibration.

The upper module 240 may be spaced upward from the base 230 and supported by the plurality of lower pillars 231. The neck body 300 may be connected to the upper module 240.

In more detail, the upper module 240 may include a plurality of plates 241 and 242 spaced apart from each other in a vertical direction, and a plurality of upper pillars 243 disposed between the plurality of plates 241 and 242. The plurality of plates 241 and 242 may be disposed horizontally, respectively, and the plurality of upper pillars 243 may extend vertically.

The number of the plurality of plates 241 and 242 and the vertical distance between the plurality of plates 241 and 353 may vary as needed. That is, the height and number of floors of the upper module 240 may vary according to functions or roles required of the robot 10.

Hereinafter, a case in which the plurality of plates 241 and 242 are a pair will be described as an example.

The pair of plates 241 and 242 may include a first plate 241 spaced upward from the base 230 and a second plate 241 spaced upward from the first plate 241. In this case, the plurality of upper pillars 243 may be positioned between the first plate 241 and the second plate 242 and may support the second plate 242 from the lower side. A lower end of the upper pillar 243 may be fastened to the first plate 241, and an upper end of the upper pillar 243 may be fastened to the second plate 242. In this case, the second plate 242 may be referred to as a top plate.

Meanwhile, the main body 200 may further include at least one substrate 270 and a battery 280.

At least one substrate 270 may include a plurality of processors for operating the robot 10a. For example, a plurality of substrates 270 may be provided, and the plurality of substrates 270 may include a main control board that controls overall operation of the robot 10a and a connected power board electrically connected to a battery 280.

The at least one substrate 270 may be referred to as a controller 270.

The battery 280 may supply power required for operation of the robot 10a. The battery 280 may be electrically connected to the terminal 206, and the battery 280 may be charged through the terminal 206.

The battery 280 may be positioned lower than the substrate 270. That is, since the relatively heavy battery 280 is positioned below the main body 200, the center of gravity of the main body 200 can be lowered and the robot can run stably.

In more detail, the battery 280 may be located between the base 230 and the upper module 240. Base 230 may support battery 280. Also, the battery 280 may be positioned eccentrically to the rear. Therefore, the weight of the battery 280 and the weight of the neck body 300 and the head 400 (see FIG. 5) can be balanced.

At least one substrate 270 may be disposed inside the upper module 240. For example, at least one substrate 270 may be positioned between the first plate 241 and the second plate 242.

Meanwhile, lidar 204 and terminal 206 may be fastened to base 230.

Lidar 204 and terminal 206 may be mounted on the front of the base 230. In more detail, the lidar mounter 204a, to which the lidar 204 is mounted, and the charging unit 206a, from which the terminal 206 protrudes, may be fastened to the front portion of the base 230.

lidar mounter (204a) may be fastened to the upper surface of the base 230, lidar 204 may be spaced apart from the upper side of the base 230 by the lidar mounter (204a). In addition, the lidar 204 may be located lower than the upper module 240.

The charging unit 206a may be located on the lower side of the lidar mounter 204a. The terminal 206 may protrude forward from the charging unit 206a.

Meanwhile, the body 200 may further include a suspension 500 to which the driving wheel 202 is connected. For example, a pair of driving wheels 202 located on both sides of the base 230 may be provided, and a pair of suspensions 500 may include a pair of driving wheels 202 connected to each other.

The suspension 500 can minimize vibration or impact transmitted to the main body 200 through the driving wheel 202. In more detail, the driving wheel 202 may be moved up and down by the suspension 500. Therefore, even if the ground is uneven and bumpy, the driving wheel 202 can move up and down while maintaining contact with the ground. As a result, the robot can run stably with less shaking. A detailed configuration of the suspension 500 will be described later in detail.

A pair of cutouts 232 may be formed on the base 230 to prevent the driving wheel 202 and the suspension 500 from interfering with the base. A pair of cutouts 232 may be formed on both sides of the base 230.

Each cutout 232 may include a first cutout 233 where the driving wheel 202 is located and a second cutout 234 located inside in comparison with the first cutout 233.

The second cutout 234 may prevent interference between the suspension 500 and the base 230 when the driving wheel 202 moves up and down. That is, the suspension 500 may protrude downward from the base 230 through the second cutout 234.

Figure 9:
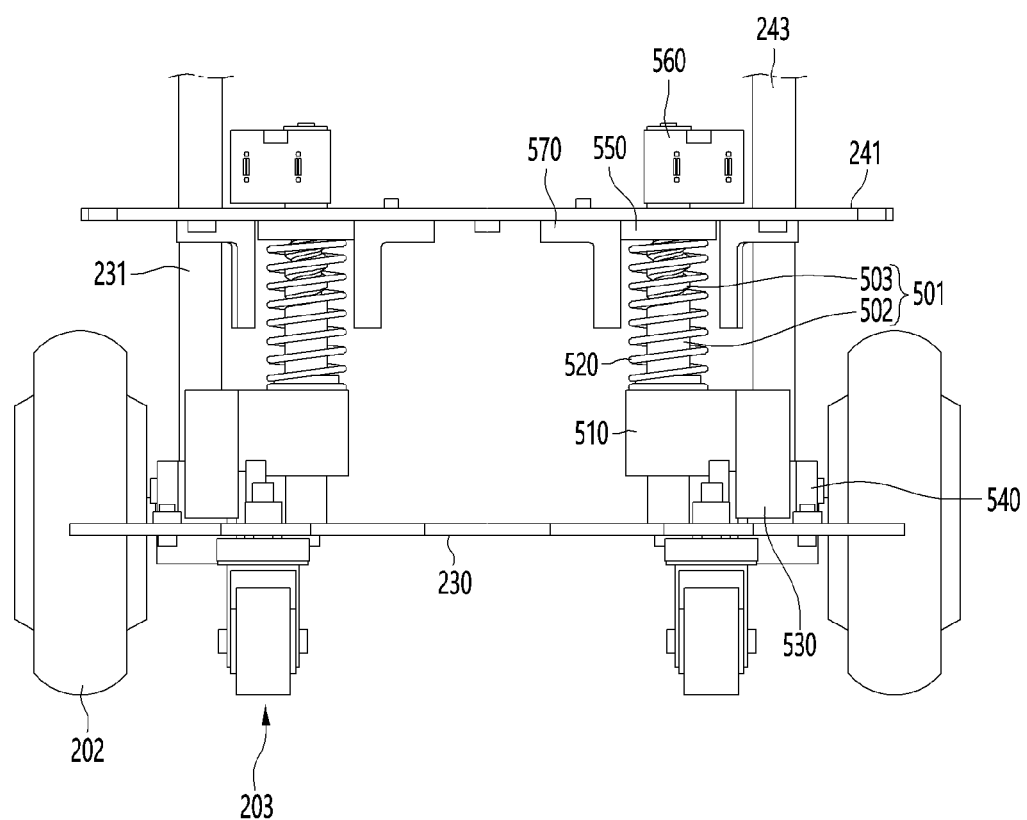
FIG. 9 is a front view of a suspension according to an embodiment of the present invention.
Figure 10:
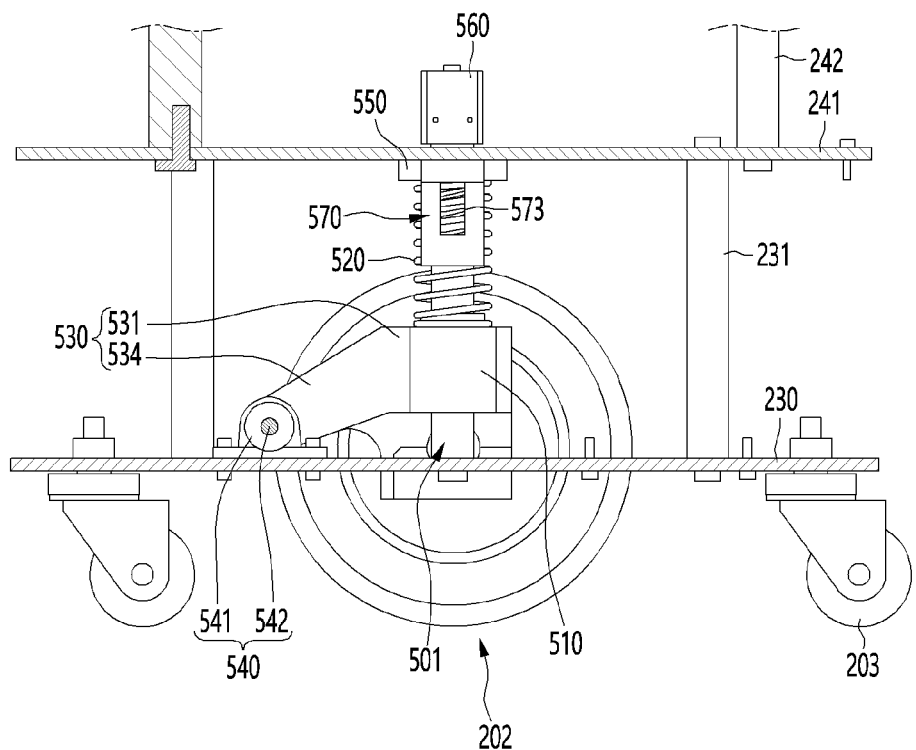
FIG. 10 is a cross-sectional view of the suspension shown in FIG. 9 viewed from the inside of the main body.
Figure 11:
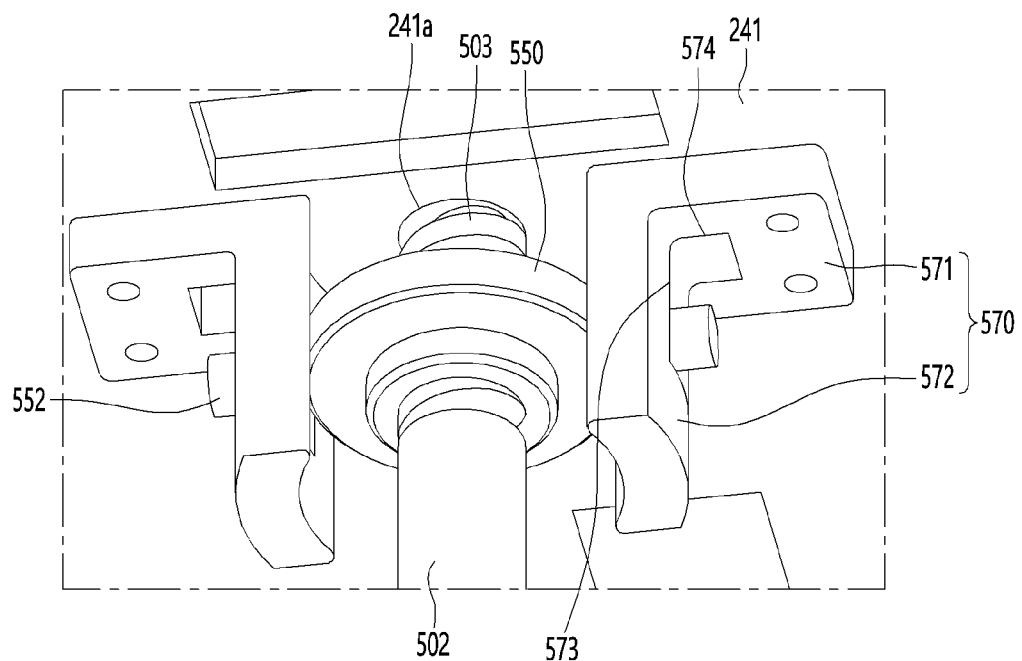
FIG. 11 is an enlarged view of the bushing top shown in FIG. 9 and its surroundings.
Figure 12:
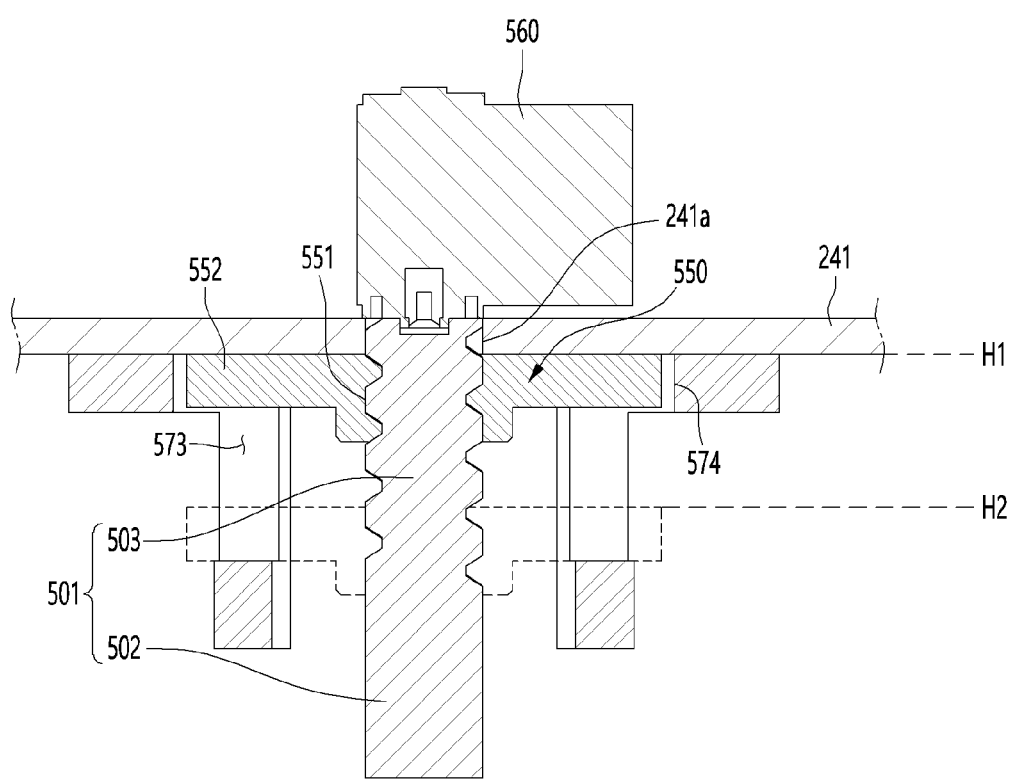
FIG. 12 is a cross-sectional view for explaining the operation of the motor shown in FIG. 11.

FIG. 9 is a front view of a suspension according to an embodiment of the present invention, FIG. 10 is a cross-sectional view of the suspension shown in FIG. 9 viewed from the inside of the main body, FIG. 11 is an enlarged view of the bushing top shown in FIG. 9 and its surroundings and FIG. 12 is a cross-sectional view for explaining the operation of the motor shown in FIG. 11.

Each suspension 500 includes a suspension bar 501, a slider 510, a spring 520, a suspension arm 530, a connector 540, a bushing top 550, a motor 560 and a guide 570 may be included.

The suspension bar 501 may extend vertically between the base 230 and the first plate 241. A lower end of the suspension bar 501 may be rotatably connected to the base 230 and an upper end of the suspension bar 501 may be connected to a motor 560 to be described later. That is, the suspension bar 501 may be rotated by the motor 560.

In more detail, the suspension bar 501 may include a shaft part 502 rotatably connected to the base 230 and a screw part 503 extending from an upper end of the shaft part 502 and connected to the motor 560.

The length of the shaft part 502 may be longer than half of the length of the suspension bar 501. A slider 510 to be described later may slide along the shaft part 502.

A screw thread may be formed on the outer circumference of the screw part 503. The length of the screw part 503 may be shorter than half of the length of the suspension bar 501. The bushing top 550 to be described later may move up and down along the screw part 503.

The screw part 503 may be connected to the motor 560 through a through hole 241a formed in the first plate 241. In more detail, the screw part 503 may extend toward the through hole 241a and may be inserted into the through hole 241a.

The slider 510 may slide along the shaft part 502 of the suspension bar 501 and move up and down. The slider 510 may be disposed to surround the outer circumference of the shaft part 502.

The spring 520 may surround the outer circumference of the suspension bar 501 and may be positioned between the slider 510 and the bushing top 550 in the vertical direction. The spring 520 may press the slider 501 downward.

An upper end of the spring 520 may be connected to the bushing top 550, and a lower end of the spring 520 may be connected to the slider 510. The spring 520 may be compressed or tensioned between the bushing top 550 and the slider 510. The spring 520 may act as a damper that cancels vibration transmitted from the driving wheel 202.

The suspension arm 530 may be connected to the slider 510 and the driving wheel 202. The slider 510 may be located on one side of the suspension arm 530, and the driving wheel 202 may be located on the other side of the suspension arm 530.

In addition, the suspension arm 530 may move the slider 510 and the driving wheel 202 up and down while rotating with respect to the connector 540.

In more detail, a long hole 535 (see FIGS. 13 to 15) formed long in one direction (for example, front and rear direction) is formed at the suspension arm 530, and is formed. A protruding pin 511 inserted in the long hole 535 may be formed at the slider 510.

As the slider 510 moves up and down, the protruding pin 511 may move between both ends of the long hole 535. As a result, the rotational motion of the suspension arm 530 may be converted into a vertical motion of the slider 510.

In addition, a through hole 536 (see FIGS. 13 to 15) through which the rotating shaft 206 of the driving wheel 202 passes may be formed at the suspension arm 530. Accordingly, the driving wheel 202 may be rotatably connected to the suspension arm 530. The through hole 536 may be formed lower than the long hole 535.

In more detail, the suspension arm 530 may include a body part 531 connected to the slider 510 and the driving wheel 202, and an arm part 534 which is extended from the body part 531 and connected to the connector 540.

The body part 531 may be located between the slider 510 and the driving wheel 202. The long hole 535 and the through hole 536 described above may be formed in the body part 531.

The arm part 534 may extend toward the connector 540 from an upper portion of the body part 531. The arm part 534 may be rotatably connected to the connector 540.

The arm part 534 may be extended in an inclined direction in which a height decreases as the distance from the body part 531 increases. Accordingly, even when the suspension arm 530 rotates downward, the arm part 534 may be positioned above the base 230. As a result, the suspension arm 530 can smoothly rotate without interfering with the base 230.

The suspension arm 530, more specifically, the body part 531 may protrude downward from the base 230 through the second cutout 234 (see FIG. 8) formed in the base 230.

The connector 540 may be fastened to the base 230 and the rotation axis of the suspension arm 530 may be connected.

In more detail, the connector 540 may include a pair of fastening parts 541 spaced apart with the suspension arm 530 interposed therebetween and a connection pin 542 penetrates the suspension arm 530 while connecting the pair of fastening parts 541.

The pair of fastening parts 541 may be fastened to the upper surface of the base 230. The pair of fastening parts 541 may be spaced apart from each other with an end of the arm part 534 interposed therebetween.

The connection pin 542 may pass through an end of the arm part 534 and connect the pair of fastening portions 541 to each other. The connection pin 542 may constitute a rotation axis of the suspension arm 530. A connection hole through which the connection pin 542 passes may be formed at an end of the suspension arm 530, more specifically, the arm part 534.

Meanwhile, the bushing top 550 may be disposed on the outer circumference of the screw part 503 of the suspension bar 501. The bushing top 550 may have a substantially disc shape. The bushing top 550 moves up and down along the screw part 503 to adjust the suspension stroke of the spring 520. In more detail, when the bushing top 550 descends, the suspension stroke of the spring 520 decreases, and when the bushing top 550 rises, the suspension stroke of the spring 520 may increase.

A fastening hole 551 through which the screw part 503 passes and fastened to the screw part 503 may be formed at the bushing top 550. A female screw thread corresponding to the screw thread formed on the outer circumference of the screw part 503 may be formed at the inner circumference of the fastening hole 551. The fastening hole 551 may be formed through the center of the bushing top 550.

At least one guide protrusion 552 protruding in a horizontal direction may be formed at the bushing top 550. The guide protrusion 552 may protrude to radial direction from the circumference of the bushing top 550. The guide protrusion 552 may be inserted into a guide groove 573 formed in the guide 570 to be described later.

Therefore, even if the screw part 503 rotates, since the guide protrusion 552 is caught in the guide groove 573, the bushing top 550 does not rotate together with the screw part 503, and may rise and fall along the longitudinal direction of the screw part 503.

The bushing top 550 may rise and fall between a first height H1 in contact with the bottom surface of the first plate 241 and a second height (H2), lower than the first height H1 and higher than half of the vertical distance between the base 230 and the first plate 241.

The motor 560 may be disposed above the first plate 241 and may be connected to the screw part 503 to rotate the suspension bar 501. The motor 560 may be connected to the screw part 503 through a through hole 241a formed at the first plate 241. A rotation axis of the motor 560 may extend vertically. Motor 560 may be a step motor.

The guide 570 may be fastened to the bottom surface of the first plate 241. The guide 570 may guide the elevation of the bushing top 550. At least one guide 570 may be provided.

The guide 570 may include a fastening part 571 fastened to the bottom surface of the first plate 241 and an extension part 572 extending downward from the fastening part 571.

The fastening part 571 may be fastened to the bottom surface of the first plate 241 by a fastening member such as a screw. The extension part 572 may vertically extend downward from the edge of the fastening part 571 toward the bushing top 550.

A guide groove 573 into which the guide protrusion 552 formed on the bushing top 550 is inserted may be formed at the guide 570. In more detail, the guide groove 573 is formed at the extension part 572 and may extend in a vertical direction.

When the bushing top 550 moves up and down, the guide protrusion 552 can move up and down along the guide groove 573 together with the bushing top 550 while being inserted into the guide groove 573. if the bushing top 550 is at the second height H2, the guide protrusion 552 may be located at the lower end of the guide groove 573.

In addition, an accommodation groove 574 connected to the guide groove 573 and into which an end of the guide protrusion 552 can be inserted may be formed at the fastening part 571. When the bushing top 550 is at the first height H1, the end of the guide protrusion 552 may be accommodated in the receiving groove 574. Thus, the guide protrusion 552 does not interfere with the guide 570, and the bushing top 550 can easily rise until it comes into contact with the bottom surface of the first plate 241.

Figure 13:
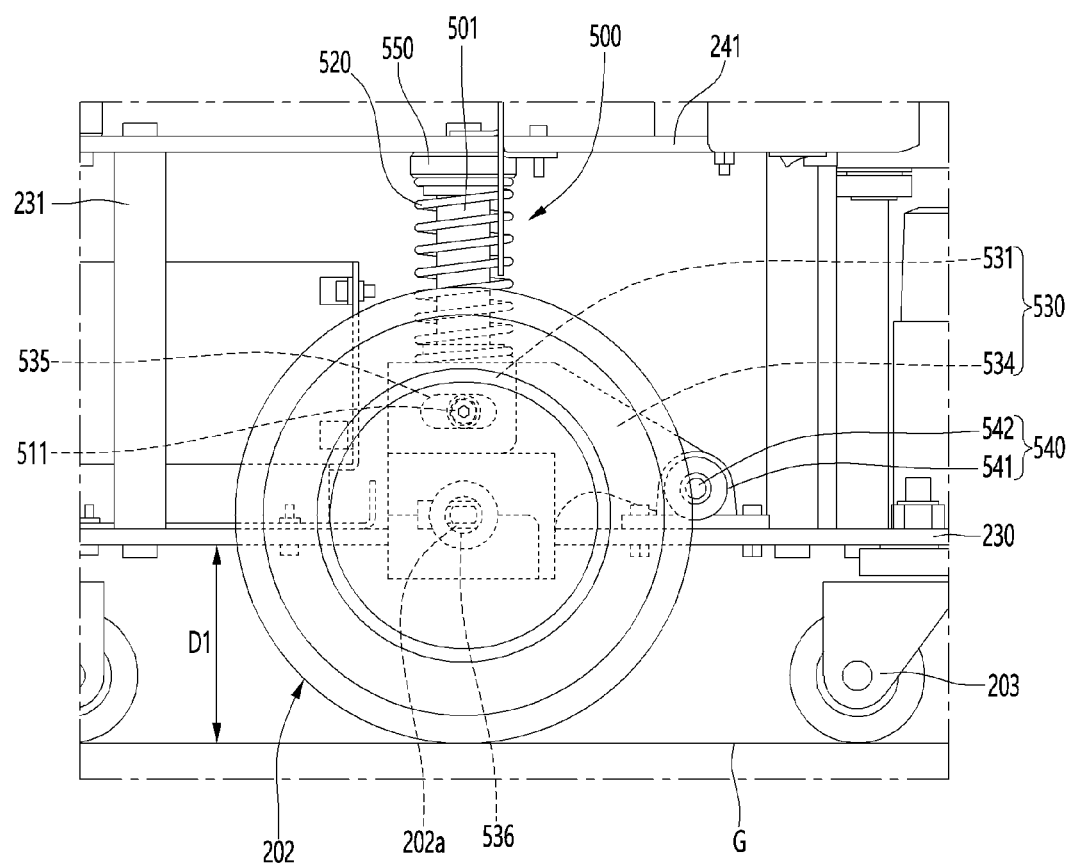
FIGS. 13, 14 and 15 are views for explaining the operation of the suspension according to an embodiment of the present invention.
Figure 14:
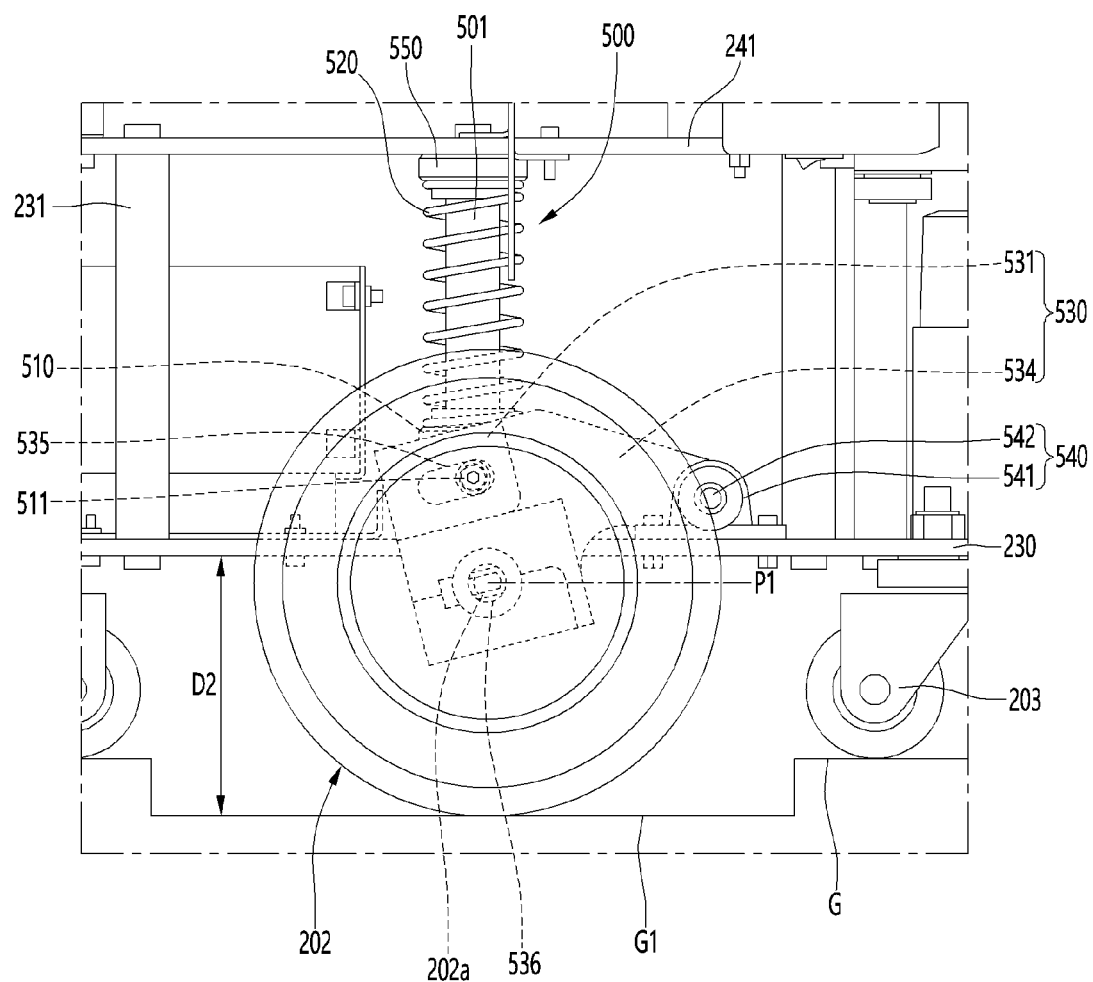
Figure 15:
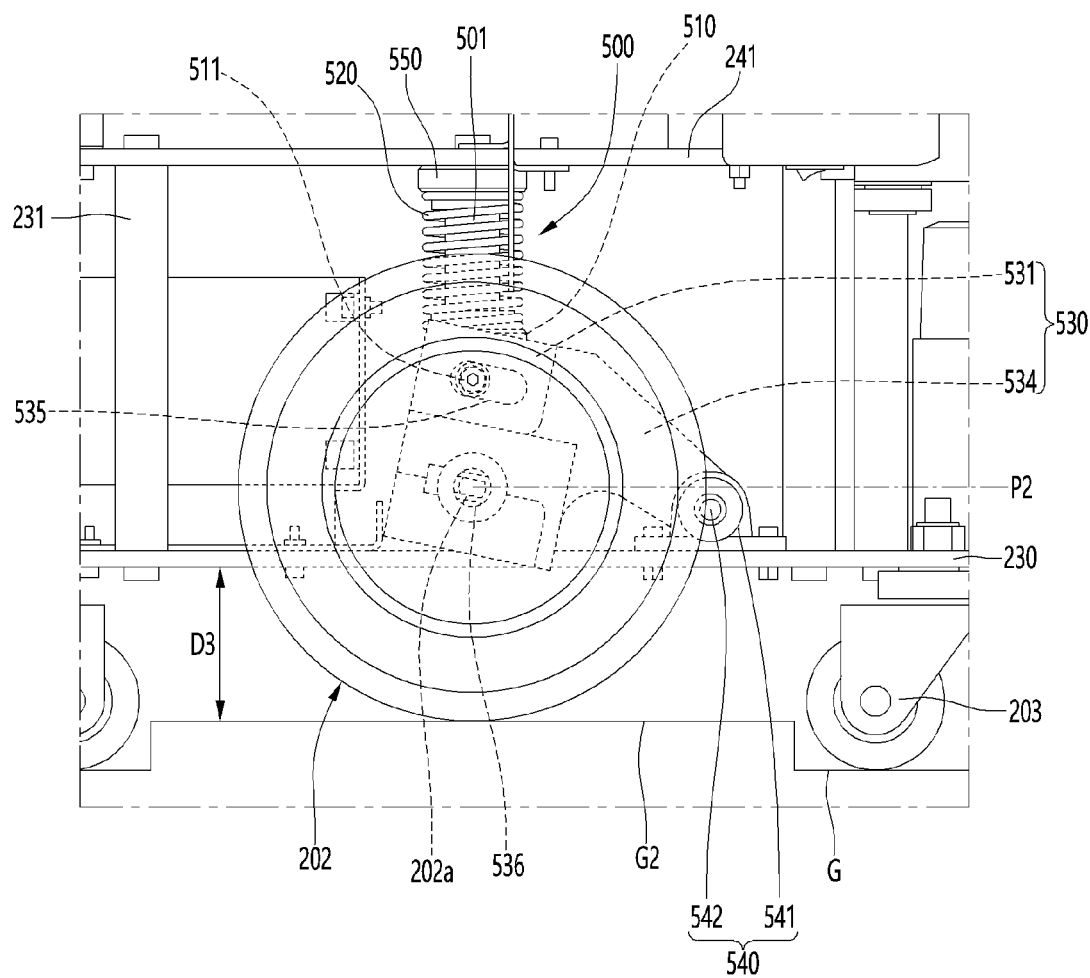

FIGS. 13, 14 and 15 are views for explaining the operation of the suspension according to an embodiment of the present invention.

As shown in FIG. 13, the driving wheel 202 may travel on a flat floor surface (G) while maintaining a normal height. In this case, the vertical distance D1 from the contact point between the driving wheel 202 and the floor surface (G) to the base 230 may be the same as or similar to the vertical distance from the contact point between the caster 203 and the floor surface G to the base 230.

As shown in FIG. 14, the driving wheel 202 may descend from a normal state and be stepped downward or maintain contact with the recessed floor surface (G1). In this case, the vertical distance (D2) from the contact point between the driving wheel 202 and the floor surface (G1) to the base 230 may be greater than the vertical distance from the contact point between the caster 203 and the floor surface (G) to the base 230.

As shown in FIG. 15, the driving wheel 202 may rise from a normal state and be stepped upward or maintain contact with the protruded floor surface (G2) or an obstacle. In this case, the vertical distance (D3) from the contact point between the driving wheel 202 and the floor surface (G2) to the base 230 may be closer than the vertical distance from the contact point between the caster 203 and the floor surface (G) to the base 230.

In more detail, the driving wheel 202, may rise and fall between a first position (P1) that the rotation axis 206 of the driving wheel 202 is located lower than the base 230 and a second positions (P2) that the rotation axis 206 of the driving wheel 202 is located higher than the base 230.

When the driving wheel 202 is at the first position (P1), the suspension arm 530 may rotate downward with respect to the center of the connector 540. At this time, the suspension arm 530, more specifically, the body part 531 may protrude downward from the base 530 through the second cutout 234 (see FIG. 8) formed at the base 230.

When the driving wheel 202 is at the second position P2, the suspension arm 530 may rotate upward around the connector 540. At this time, the suspension arm 530, more specifically, the body part 531 may move upward of the base 530 through the second cutout 234 (see FIG. 8) formed at the base 230.

The first position P1 and the second position P2 may vary according to the suspension stroke of the spring 520. As the bushing top 550 descends, the suspension stroke of the spring 520 may decrease and the suspension strength may increase.

That is, the elastic force of the spring 520 that presses the slider 510 downward increases, so that the contact force with respect to the floor surface G of the driving wheel 202 increases. Therefore, the driving wheel 202 does not spin, and the robot 10a can travel stably.

However, if the suspension strength of the spring 520 is too great, the contact force between the caster 203 and the floor surface G is weakened, making stable driving difficult. Therefore, it is important to adjust the stroke of the spring 520 to have proper suspension strength.

Figure 16:
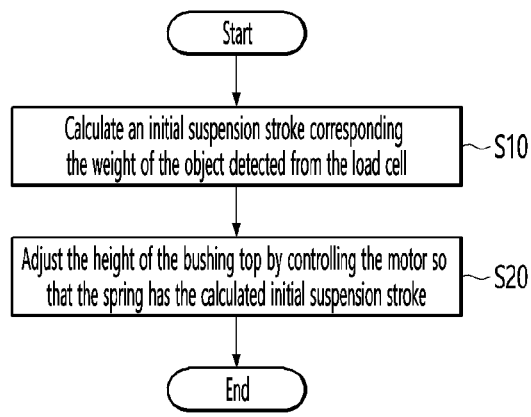
FIG. 16 is a flowchart illustrating a method of adjusting a suspension stroke according to a weight of an object.

FIG. 16 is a flowchart illustrating a method of adjusting a suspension stroke according to a weight of an object.

The controller 270 may adjust the suspension stroke of the spring 520 according to the weight of the object while the robot 10a is stopped.

The controller 270 may detect the weight of the object in the load cell 931 (see FIG. 6) provided in the loading module 900, and may calculate an initial suspension stroke st1 corresponding thereto (S10).

In more detail, the controller 270 may calculate the total weight by adding the previously stored weight of the robot 10a and the weight of the object detected by the load cell 931. Thereafter, the controller 270 may calculate an initial suspension stroke st1 of the spring 520 that matches the total weight.

In more detail, the controller 270 may calculate the stroke of the spring 520 according to the following equation.

$$S = \frac{W}{T*N*k} - S_0$$

In the above equation, 'S' is the suspension stroke of the spring 520, 'W' is the sum of the weight of the robot 10*a* and the weight of the object, 'N' is the number of driving wheels 202, and 'k' is the elastic coefficient of the spring 520, and '$S_O$' is a compression amount of the spring 520 when the floor surface G is horizontal in a state where the bushing top 550 is in contact with the bottom surface of the first plate 241, and 'T' is a predetermined correction constant.

The correction constant (T) may be set differently according to the weight of the robot 10*a* without the object and the number of driving wheels 202.

The correction constant (T) is a key factor determining the suspension stroke of the spring 520 according to the weight of the object. The correction constant (T) may be greater than or equal to 1.3 and less than or equal to 2. Preferably, the correction constant (T) may be 1.65 or more and 1.75 or less. When the correction constant T satisfies the numerical range, shaking of the robot 10*a* during travel is reduced and stable travel is possible.

The controller 270 may adjust the height of the bushing top 550 by controlling the motor 560 so that the spring 520 has the calculated initial suspension stroke st1 (S20).

Figure 17:
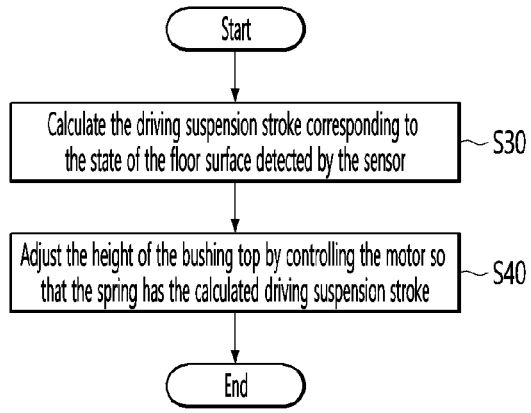
FIG. 17 is a flowchart illustrating a method of adjusting a suspension stroke according to a state of a floor surface.

FIG. 17 is a flowchart illustrating a method of adjusting a suspension stroke according to a state of a floor surface.

The controller 270 may adjust the suspension stroke of the spring 520 according to the state of the floor while the robot 10*a* is traveling.

The controller 270 may calculate the driving suspension stroke st2 corresponding to the state of the floor surface detected by the sensor (S30). The sensor may include at least one of a lidar 206, an ultrasonic sensor 205, and a vision sensor 310.

In more detail, the controller 270 may match the driving suspension stroke st2 according to the condition of the floor surface according to a pre-stored library. The library may have the state of the floor surface as an input value, and may have the driving suspension stroke (st2) matched thereto as an output value.

In addition, the library may have the weight of the object loaded on the robot 10*a* as an additional input value. Therefore, even if the state of the floor surface is the same, the driving suspension stroke st2 may vary according to the weight of the object loaded on the robot 10*a*.

The controller 270 may adjust the height of the bushing top 550 by controlling the motor 560 so that the spring 520 has the calculated driving suspension stroke st2 (S40).

Figure 18:
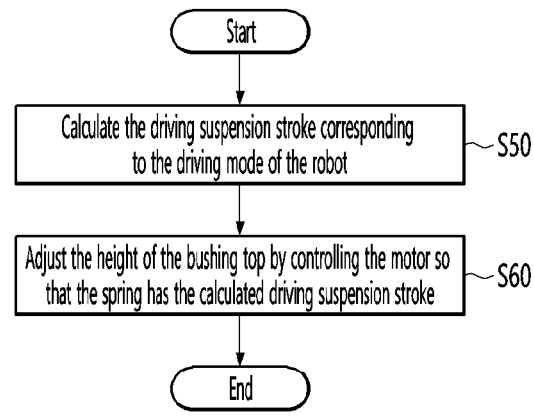
FIG. 18 is a flowchart illustrating a method of adjusting a suspension stroke according to a driving mode.

FIG. 18 is a flowchart illustrating a method of adjusting a suspension stroke according to a driving mode.

The controller 270 may adjust the suspension stroke of the spring 520 according to the driving mode of the robot 10*a*.

The controller 270 may determine the driving mode of the robot 10*a* according to a user's command input through an input interface. For example, the driving mode of the robot 10*a* may include a high-speed driving mode in which the driving speed of the robot 10*a* is accelerated to a first speed, or an accelerated low-speed drive mode in which a driving speed of the robot 10*a* is accelerated to a second speed lower than the first speed. That is, the controller 270 may control the rotational speed of the driving wheel 202 according to the driving mode of the robot 10*a*.

The controller 270 may calculate the driving suspension stroke st3 corresponding to the driving mode of the robot 10*a* (S50).

In more detail, the controller 270 may match the driving suspension stroke st3 according to the condition of the floor surface according to a pre-stored library. The library may have a driving mode as a first input value and a driving suspension stroke (st3) matched thereto as an output value. In addition, the library may have a weight of an object loaded on the robot 10*a* as a first addition input value, and may have a state of a floor surface as a second addition input value. Therefore, even in the same driving mode, the driving suspension stroke st3 may vary according to the weight of the object loaded on the robot 10*a* and the condition of the floor surface.

The controller 270 may adjust the height of the bushing top 550 by controlling the motor 560 so that the spring 520 has the calculated driving suspension stroke st3 (S60).

Figure 19:
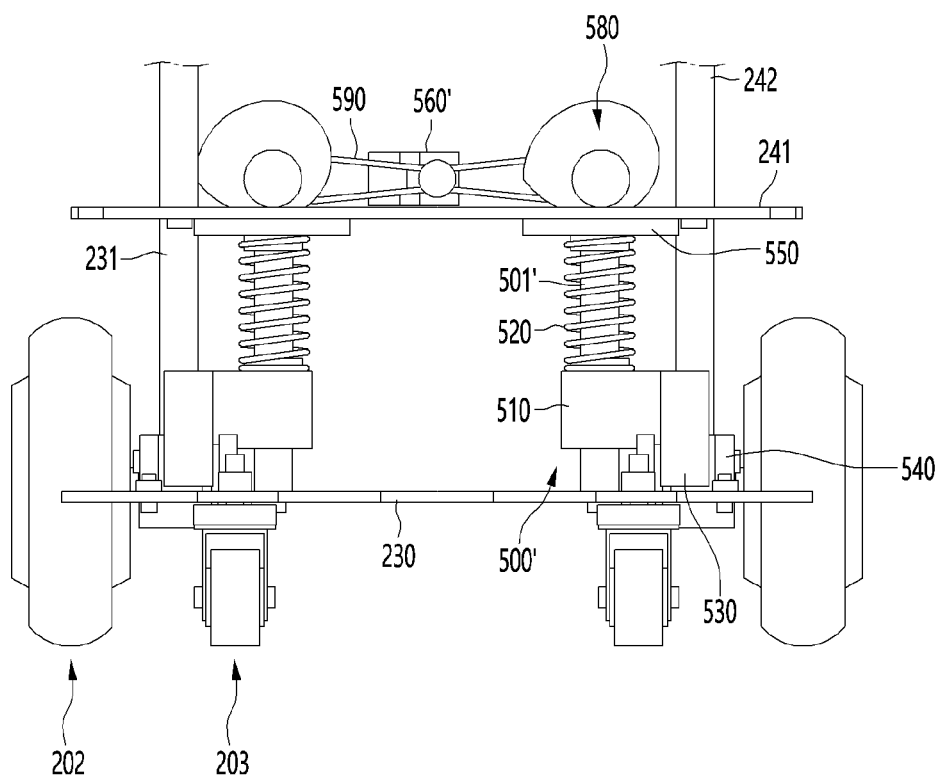
FIG. 19 is a front view of a suspension according to another embodiment of the present invention.
Figure 20:
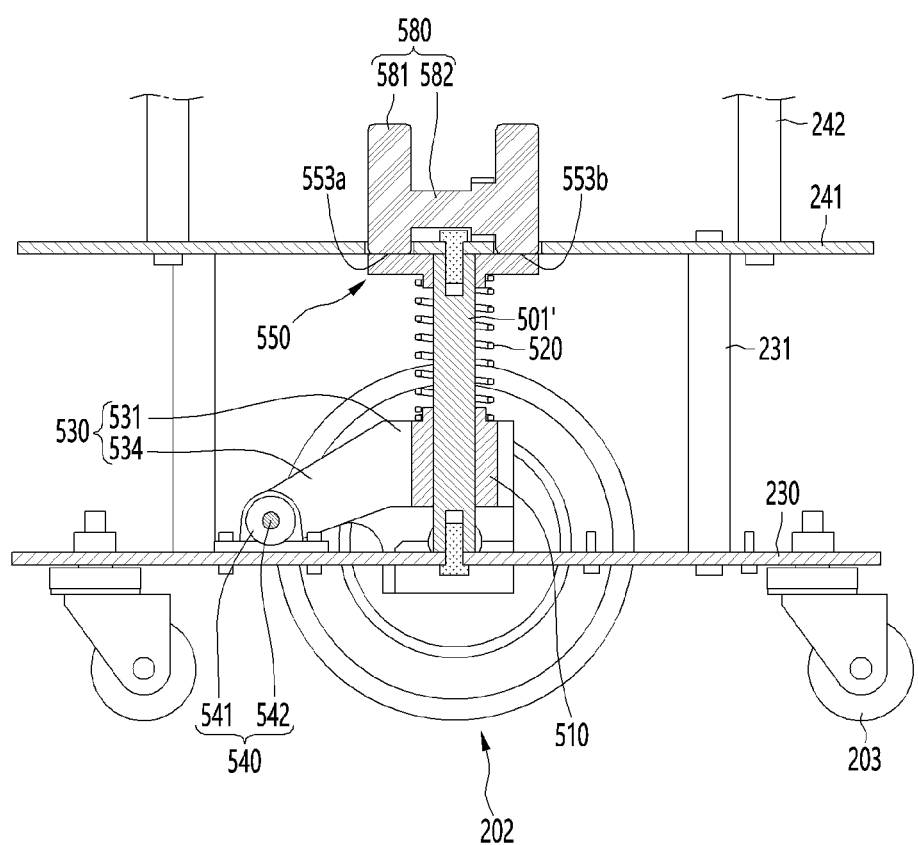
FIG. 20 is a cross-sectional view of the suspension shown in FIG. 19 viewed from the inside of the main body.
Figure 21:
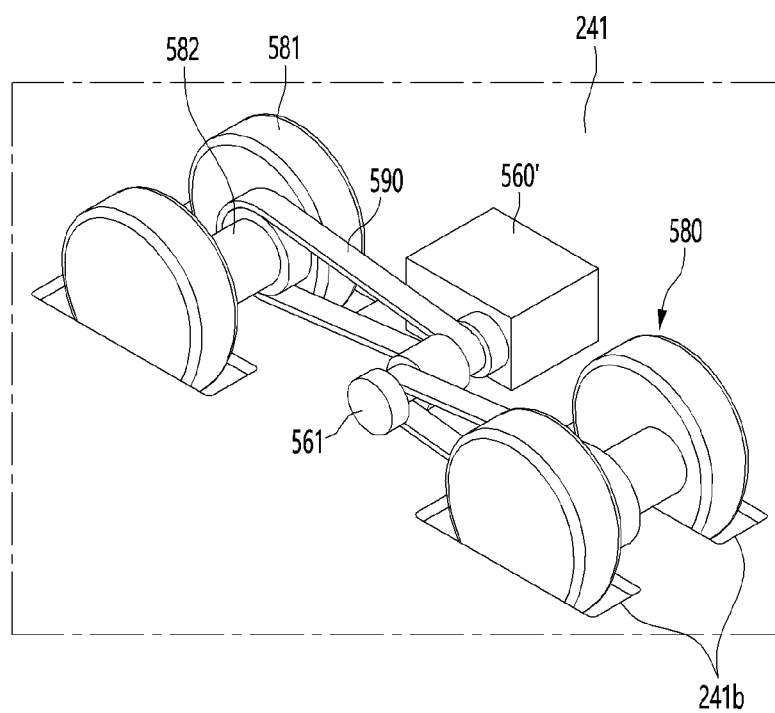
FIG. 21 is an enlarged view of the pair of cams shown in FIG. 19 and their surroundings.
Figure 22:
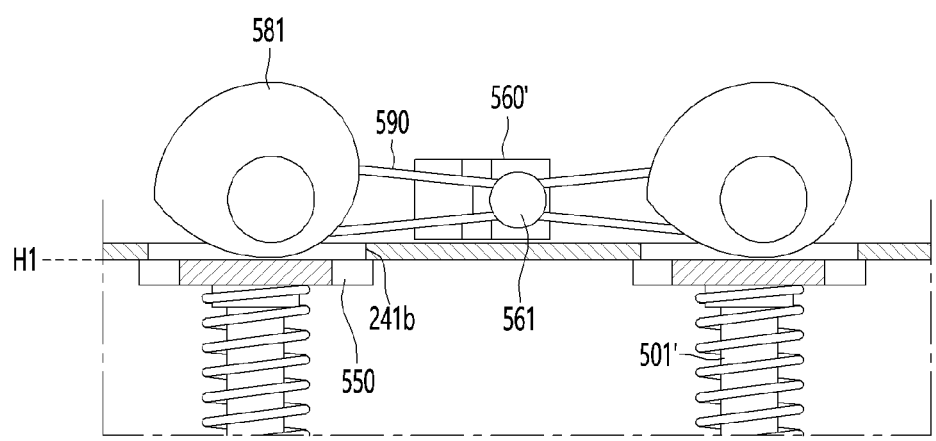
FIGS. 22 and 23 are views for explaining the operation of the motor shown in FIG. 21.
Figure 23:
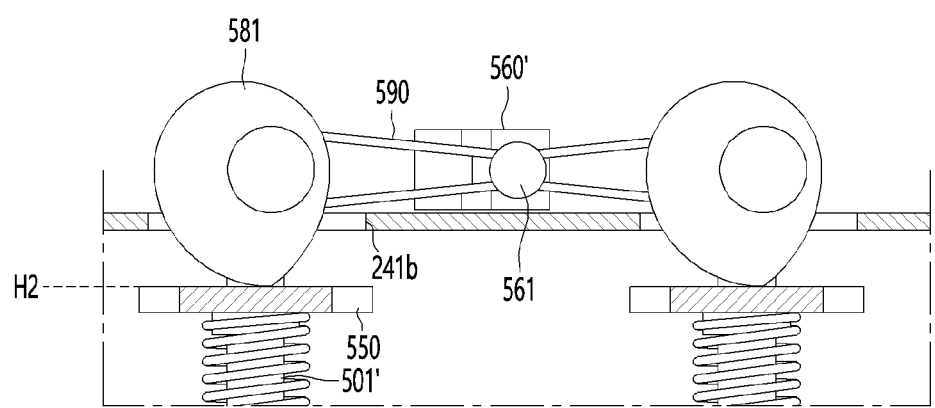

FIG. 19 is a front view of a suspension according to another embodiment of the present invention, FIG. 20 is a cross-sectional view of the suspension shown in FIG. 19 viewed from the inside of the main body, FIG. 21 is an enlarged view of the pair of cams shown in FIG. 19 and their surroundings and FIGS. 22 and 23 are views for explaining the operation of the motor shown in FIG. 21.

Hereinafter, overlapping content with the above-described embodiment will be omitted, and the differences will be mainly described.

The lower end of the suspension bar 501' according to the present embodiment may be fixed to the base 230, and the upper end of the suspension bar 501' may be fixed to the first plate 241. That is, the suspension bar 501' may not rotate and may not include the screw part 503.

The slider 510 and the bushing top 550 can slide along the suspension bar 501'.

The suspension 500' according to this embodiment may not include the guide 570 described above. Therefore, the guide protrusion 552 may not be formed on the bushing top 550.

The suspension 500' according to the present embodiment may further include a cam 580 that presses the bushing top 550 downward and a power transmission member 590 that transmits the power of the motor 560' to the cam 580.

The cam 280 may press the bushing top 550 downward through the long hole 241*b* formed at the first plate 241. Cam 280 may be rotated by motor 560'.

In more detail, the cam 580 presses the bushing top 550 downward and connects a pair of cam bodies 581 spaced apart from each other and the pair of cam bodies 581, and may include the first plate 241 a connection shaft 582 located on the upper side.

The cam body 581 may be formed in a non-circular shape. Therefore, the cam body 581 may change the degree of pressing the bushing top 550 according to rotation.

The pair of cam bodies 581 may be horizontally spaced apart, and may press different parts of the bushing top 550 downward. The pair of cam bodies 581 may press different parts of the bushing top 550 downward through a pair of long holes 241*b* separated from each other. An upper end of the suspension bar 501' may be fastened to a portion between the pair of long holes 241*b* of the bottom surface of the first plate 241.

In more detail, the upper surface of the bushing top 550 may include a first area 553*a* pressed by one of the pair of cam bodies 581 and a second area 553*a* pressed by the other one of the pair of cam bodies 581. The first area 553*a* and the second area 553*b* may be symmetrical to each other with respect to the suspension bar.

As a result, since the bushing top 550 is pressurized uniformly, the bushing top 550 can be moved up and down reliably without being deformed.

The connection shaft 582 may extend in a horizontal direction and may be connected to a power transmission member 590 to be described later. The connection shaft 582 is engaged with the pair of cam bodies 581 and may rotate together with the pair of cam bodies 581.

A rotation shaft 561 extending in a horizontal direction may be connected to the motor 560'. The rotating shaft 561 may extend in a direction parallel to the connection shaft 582 and may be positioned above the first plate 241.

The power transmission member 590 may include a belt or chain forming a closed loop. The power transmission member 590 may connect the rotation shaft 582 and the connection shaft 561.

A single motor 560' can simultaneously rotate a pair of cams 580. In more detail, a pair of power transmission members 590 may be connected to the rotation shaft 561. One of the pair of power transmission members 590 may be connected to the connection shaft 582 of one of the pair of cams 580, and the other one of the pair of power transmission members 590 may be connected to the connection shaft 582 of the other one of the pair of the cams 580.

Thus, the suspension strokes of the pair of springs 520 acting on the pair of driving wheels 202 can always be adjusted equally. Therefore, the robot 10a can run stably without leaning to either side.

The above description is merely an example of the technical idea of the present invention, and various modifications and variations can be made to those skilled in the art without departing from the essential characteristics of the present invention.

Therefore, the embodiments disclosed in the present invention are not intended to limit the technical idea of the present invention, but to explain, and the scope of the technical idea of the present invention is not limited by these embodiments.

The protection scope of the present invention should be construed according to the following claims, and all technical ideas within the equivalent range should be construed as being included in the scope of the present invention.

The invention claimed is:

1. A robot comprising:
a base;
a driving wheel protruding downward from the base;
a plate spaced upward from the base;
a through hole formed in the plate;
a suspension bar including a shaft part rotatably connected to the base and vertically extending upward, and a screw part vertically extending from an upper end of the shaft part toward the through hole;
a slider configured to slide along the shaft part and connected to the driving wheel;
a bushing top configured to move up and down along the screw part when the suspension bar rotates;
a spring located on an outer circumference of the suspension bar and located between the bushing top and the slider; and
a motor disposed above the plate and connected to the screw part through the through hole and configured to rotate the suspension bar,
the robot further comprising a guide fastened to a bottom surface of the plate to guide a lifting of the bushing top,
wherein a guide protrusion protruding in a horizontal direction is formed on the bushing top, and
the guide protrusion is inserted into the guide and a guide groove extending in a vertical direction is formed.

2. The robot according to claim 1, wherein the guide comprises:
a fastening part fastened to the bottom surface of the plate; and
an extension part extending downward from the fastening part and the guide groove is formed at the extension part.

3. The robot according to claim 2, wherein an accommodation groove is formed in the fastening part, and
when the bushing top is in contact with the bottom surface of the plate, an end of the guide protrusion is accommodated in the accommodation groove.

4. The robot according to claim 1, wherein the bushing top moves up and down between a first height in contact with the bottom surface of the plate and a second height lower than the first height and higher than half of a vertical distance between the base and the plate.

5. The robot according to claim 1, further comprising:
a loading unit located on the upper side of the plate and configured to support an object;
a load cell configured to detect a weight of an object loaded on the loading unit; and
a controller configured to control the motor so that the bushing top descends as a sensing value of the load cell increases.

6. The robot according to claim 5,
wherein the driving wheel is one of a plurality of driving wheels, and
wherein the controller is configured to move up and down the bushing top so that a suspension stroke of the spring is determined according to the following equation:

$$S = \frac{W}{T*N*k} - S_0$$

where
S: suspension stroke of the spring,
W: a sum of a previously stored weight of the robot and the weight of the object loaded on the loading unit of the robot,
N: a number of the driving wheels,
k: elastic coefficient of the spring,
$S_0$: compression amount of the spring when a floor surface is horizontal in a state where the bushing top is in contact with the bottom surface of the plate, and
T: a predetermined correction constant of 1.3 or more and 2 or less.

7. The robot according to claim 6, wherein the correction constant is 1.65 or more and 1.75 or less.

8. The robot according to claim 1, further comprises:
a sensor configured to detect a state of a floor surface contacted by the driving wheel; and
a controller configured to control the motor according to a sensing value of the sensor.

9. The robot according to claim 1, further comprising a controller configured to control the motor according to a rotational speed of the driving wheel.

10. The robot according to claim 1, further comprising:
a connector fastened to the base; and
a suspension arm configured to connect the slider with the driving wheel and rotate about a rotation axis connected to the connector.

11. The robot according to claim 1, further comprising:
a plurality of lower pillars extending upward from the base, supporting the plate, and spaced apart in parallel with the suspension bar.

12. A robot comprising:
a base;
a driving wheel protruding downward from the base;
a plate spaced upward from the base;
a suspension bar extending vertically from the base toward the plate;
a spring disposed on an outer circumference of the suspension bar;
a slider configured to slide along the suspension bar at a lower side of the spring and connected to the driving wheel;
a bushing top configured to slide along the suspension bar on an upper side of the spring;
a motor disposed above the plate;
a long hole formed in the plate; and
a cam configured to be rotated by the motor and to press the bushing top downward through the long hole,
wherein the cam comprises:
a pair of cam bodies configured to press the bushing top downward and are spaced apart from each other; and
a connection shaft connecting the pair of cam bodies, located on an upper side of the plate, and extending in a horizontal direction,
the robot further comprises:
a rotation shaft connected to the motor and extending in a direction parallel to the connection shaft; and
a chain or belt connecting the rotation shaft and the connection shaft.

13. The robot according to claim 12, wherein an upper surface of the bushing top comprises:
a first area pressed by one of the pair of cam bodies; and
a second area pressed by the other of the pair of cam bodies and symmetrical to the first area with respect to the suspension bar.

14. A robot comprising:
a base;
a pair of driving wheels protruding downward from both sides of the base;
a plate spaced upward from the base;
a pair of suspension bars vertically extending from the base toward the plate;
a pair of springs disposed on outer circumferences of the pair of suspension bars;
a pair of sliders configured to slide along the pair of suspension bars at a downside of the pair of springs and connected to the pair of driving wheels;
a pair of bushing tops configured to slide along the pair of suspension bars at an upper side of the pair of springs;
a motor disposed above the plate;
a plurality of long holes formed at the plate; and
a plurality of cams configured to be rotated by the motor and to press the pair of bushing tops downward through the plurality of long holes,
wherein each of the plurality of cams comprises:
a pair of cam bodies configured to press the bushing top downward and are spaced apart from each other; and
a connection shaft configured to connect the pair of cam bodies and extending in a horizontal direction and located on an upper side of the plate;
the robot further comprising:
a rotation shaft coupled to the motor; and
a plurality of chains or a plurality of belts configured to connect the rotation shaft and the plurality of connection shafts.

* * * * *